(12) United States Patent
Zhu et al.

(10) Patent No.: US 11,589,722 B2
(45) Date of Patent: Feb. 28, 2023

(54) CLEANING METHOD AND CLEANING ROBOT

(71) Applicant: HANGZHOU EZVIZ SOFTWARE CO., LTD., Hangzhou (CN)

(72) Inventors: Jianhua Zhu, Hangzhou (CN); Bingwei Shen, Hangzhou (CN); Nicong Jiang, Hangzhou (CN); Bin Guo, Hangzhou (CN); Anqiang Du, Hangzhou (CN); Haiqing Jiang, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 346 days.

(21) Appl. No.: 16/957,167

(22) PCT Filed: Dec. 4, 2018

(86) PCT No.: PCT/CN2018/119035
§ 371 (c)(1),
(2) Date: Jun. 23, 2020

(87) PCT Pub. No.: WO2019/128636
PCT Pub. Date: Jul. 4, 2019

(65) Prior Publication Data
US 2020/0345192 A1    Nov. 5, 2020

(30) Foreign Application Priority Data

Dec. 26, 2017   (CN) .......................... 201711434377

(51) Int. Cl.
*A47L 11/00* (2006.01)
*A47L 11/24* (2006.01)
*A47L 11/40* (2006.01)

(52) U.S. Cl.
CPC ........... *A47L 11/24* (2013.01); *A47L 11/4011* (2013.01); *A47L 11/4061* (2013.01); *A47L 2201/06* (2013.01)

(58) Field of Classification Search
CPC ................. A47L 11/24; A47L 11/4011; A47L 11/4061; A47L 2201/06; A47L 9/281;
(Continued)

(56) References Cited

U.S. PATENT DOCUMENTS

| 2005/0000543 A1 | 1/2005 | Taylor et al. |
| 2007/0282484 A1 | 12/2007 | Chung et al. |
| 2009/0194137 A1 | 8/2009 | Friedman et al. |
| 2013/0206177 A1 | 8/2013 | Burlutskiy |

(Continued)

FOREIGN PATENT DOCUMENTS

| AU | 2015224421 A1 * | 10/2015 | .......... A47L 11/4011 |
| CA | 2869454 A1 * | 5/2014 | .......... A47L 11/4011 |

(Continued)

OTHER PUBLICATIONS

International Search Report and Written Opinion issued in Corresponding PCT Application No. PCT/CN2018/119035, dated Feb. 27, 2019 (English translation of International Search Report provided).
Extended European Search Report issued in Corresponding European Application No. 18896191.6, dated Dec. 23, 2020.

*Primary Examiner* — Yonel Beaulieu
(74) *Attorney, Agent, or Firm* — Norton Rose Fulbright US LLP

(57) ABSTRACT

A cleaning method and a cleaning robot are provided. The method includes: after the cleaning robot obtains a cleaning instruction for a target scene, acquiring a current power of the cleaning robot and a scene map for the target scene; if it is determined that the current power is insufficient to clean all areas to be cleaned in the target scene, determining a (Continued)

after a cleaning robot obtains a cleaning instruction for a target scene, acquiring a scene map for the target scene and acquiring a current power of the cleaning robot — S101 if it is determined that the current power is insufficient to clean all areas to be cleaned in the target scene, determining a target cleaning area from all the areas to be cleaned in the target scene, based on a target dirtiness level for each of the areas to be cleaned — S102 cleaning the target cleaning area based on the scene map, the target dirtiness level for the target cleaning area and the current power amount — S103 target cleaning area from all the areas to be cleaned in the target scene, based on a target dirtiness level for each of the areas to be cleaned; cleaning the target cleaning area based on the scene map, the target dirtiness level for the target cleaning area and the current power. A more intelligent cleaning robot and a more reasonable cleaning process are realized.

20 Claims, 6 Drawing Sheets

(58) Field of Classification Search
CPC .... A47L 9/2842; A47L 9/2852; A47L 9/2831; A47L 2201/04; A47L 11/00; A47L 9/00; G05D 2201/0215; G05D 1/0219; G05D 1/00

See application file for complete search history.

(56) References Cited

U.S. PATENT DOCUMENTS

| | | | |
|---|---|---|---|
| 2014/0207280 A1 | 7/2014 | Duffley et al. | |
| 2014/0207282 A1* | 7/2014 | Angle | H04W 4/30 901/1 |
| 2015/0150428 A1 | 6/2015 | Park et al. | |

FOREIGN PATENT DOCUMENTS

| | | |
|---|---|---|
| CN | 102727135 | 10/2012 |
| CN | 105790372 | 7/2016 |
| CN | 105892321 | 8/2016 |
| CN | 106913289 | 7/2017 |
| CN | 106983454 | 7/2017 |
| CN | 107328419 | 11/2017 |
| JP | 2014161448 | 9/2014 |

* cited by examiner

CLEANING METHOD AND CLEANING ROBOT

CROSS REFERENCE TO RELATED APPLICATIONS

The present application is a national phase application under 35 U.S.C. § 371 of International Application No. PCT/CN2018/119035, filed Dec. 4, 2018, which claims the benefit of priority to Chinese patent application No. 201711434377.8, filed with the China National Intellectual Property Administration on Dec. 26, 2017 and entitled "cleaning method and cleaning robot", each of which are incorporated herein by reference in their entirety.

TECHNICAL FIELD

The present application relates to the technical field of a cleaning robot, and in particular to a cleaning method and a cleaning robot.

BACKGROUND

With the development of science and technology, cleaning robots are more and more commonly used. The existing cleaning robots generally adopt the principle of proximity in the cleaning process to clean different areas of a target scene along a route with the shape of the Chinese character "弓". In the existing cleaning robots, different conditions of different areas in the target scene in the cleaning process are not considered, which is likely to cause the cleaning to be less reasonable and less intelligent under the condition of limited power.

In a home scene, for instance, areas such as a living room, a kitchen and the like are more prone to get messy, while areas such as a bedroom are not prone to get messy. The above situation will not be considered by the existing cleaning robots adopting the principle of proximity in the cleaning process of the home scene along a route with the shape of the Chinese character "弓". In this case, it is possible that the limited power is used to clean a less messy bedroom area rather than an area that is more likely to get messy, such as a living room, a kitchen and the like, which makes the cleaning process of the cleaning robots to be less reasonable and the cleaning robots to be less intelligent.

Accordingly it is urgently desired to provide a more intelligent cleaning robot.

SUMMARY

Embodiments of the present application aim to provide a cleaning method and a cleaning robot, so as to realize a more intelligent cleaning robot and a more reasonable cleaning process. The specific technical solutions are as follows.

On one hand, an embodiment of the present application provides a cleaning method, including:

after a cleaning robot obtains a cleaning instruction for a target scene, acquiring a scene map for the target scene and acquiring a current power of the cleaning robot;

if it is determined that the current power is insufficient to clean all areas to be cleaned in the target scene, determining a target cleaning area from all the areas to be cleaned in the target scene, based on a target dirtiness level for each of the areas to be cleaned;

cleaning the target cleaning area based on the scene map, the target dirtiness level for the target cleaning area and the current power.

Optionally, the step of determining a target cleaning area from all the areas to be cleaned in the target scene, based on a target dirtiness level for each of the areas to be cleaned includes:

determining an area to be cleaned having a maximum target dirtiness level from all the areas to be cleaned in the target scene as the target cleaning area, based on the target dirtiness level for each of the areas to be cleaned.

Optionally, the step of determining a target cleaning area from all the areas to be cleaned in the target scene, based on a target dirtiness level for each of the areas to be cleaned includes:

determining an area to be cleaned having a minimum target dirtiness level from all the areas to be cleaned in the target scene as the target cleaning area, based on the target dirtiness level for each of the areas to be cleaned.

Optionally, all areas in the target scene are represented in the scene map in a preset reduced scale, and each of the areas in the target scene represented in the scene map is divided into a plurality of grids in advance;

each of the grids in each of the areas in the target scene corresponds to a target dirtiness factor; wherein, the target dirtiness factor is a factor determined based on historical dirtiness factors for the corresponding grid and is in direct proportion to a dirtiness situation of the corresponding grid, and the target dirtiness level for the target cleaning area is a sum or average of target dirtiness factors for all the grids in the target cleaning area;

the step of cleaning the target cleaning area based on the scene map, the target dirtiness level for the target cleaning area and the current power includes:

determining a grid where the cleaning robot is located in the target scene as a starting grid and determining a grid where a charging base is located in the target scene as an ending grid, based on the grids in each of the areas in the target scene in the scene map;

determining a path from the starting grid to the ending grid through all the grids in the target cleaning area as a first cleaning path, based on the grids in each of the areas in the target scene in the scene map;

determining power consumption during a process of the cleaning robot finishing cleaning all the grids in the target cleaning area as first power consumption, based on the first cleaning path and the target dirtiness factors for all the grids in the target cleaning area;

determining whether the first power consumption is greater than the current power;

if it is determined that the first power consumption is not greater than the current power, cleaning all the grids in the target cleaning area, based on the grids in each of the areas in the target scene in the scene map, the first cleaning path and the target dirtiness factors for all the grids in the target cleaning area.

Optionally, a formula used in the step of determining power consumption during a process of the cleaning robot finishing cleaning all the grids in the target cleaning area as first power consumption, based on the first cleaning path and the target dirtiness factors for all the grids in the target cleaning area is:

$$W_i = w_3 l_1/v + \sum_{j=1}^{n_i} w_1 q_{ij} \beta_1 + \sum_{j=1}^{n_i} \alpha \beta_2 q_{ij}^2,$$

wherein, $W_i$ represents the first power consumption; $l_1$ represents a length of the first cleaning path; v represents a walking speed of the cleaning robot among grids by means of a walking motor; $w_3$ represents a current of the walking motor during operation; $w_3 l_1/v$ represents power consumption of the walking motor when the cleaning robot travels along the first cleaning path; $q_{ij}$ represents a target dirtiness factor for a grid j in a target cleaning area i; a value range of j is $[1,n_i]$; $n_i$ represents the total number of the grids in the target cleaning area i; $w_i$ represents a current of a side brush of the cleaning robot during operation;

$$\sum_{j=1}^{n_i} w_1 q_{ij} \beta_1$$

represents power consumption of the side brush of the cleaning robot during operation;

$$\sum_{j=2}^{n_i} \alpha \beta_2 q_{ij}^2$$

represents power consumption of a fan or a rolling brush during operation; α, $\beta_1$ and $\beta_2$ are preset proportion factors, respectively.

Optionally, after the step of cleaning all the grids in the target cleaning area, based on the grids in each of the areas in the target scene in the scene map, the first cleaning path and the target dirtiness factors for all the grids in the target cleaning area, the method further includes:

returning to perform the step of acquiring the current power of the cleaning robot.

Optionally, the method further includes:

if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area, wherein the preset grid cleaning rule is a rule that defines the sum of the target dirtiness factors for the grids determined to be cleaned from the target cleaning area to be maximum if the current power allows;

if it is determined that there is a grid meeting the preset grid cleaning rule, determining the grid meeting the preset grid cleaning rule as a target cleaning grid;

cleaning the target cleaning area based on the determined target cleaning grid, the starting grid and the ending grid.

Optionally, the step of determining whether there is a grid meeting a preset grid cleaning rule in the target cleaning area, based on the grids in each of the areas in the target scene in the scene map, the current power and the target dirtiness factor for each of the grids in the target cleaning area includes:

acquiring a preset target function for representing a maximum sum of the target dirtiness factors for the grids determined to be cleaned from the target cleaning area, wherein the preset target function is:

$$Q = \sum_{k=1}^{K} q_{ij_2}$$

wherein, $q_{ij_k}$ represents the target dirtiness factors for the grids determined to be cleaned from the target cleaning area; a value range of K is $[1,n_i]$; $n_i$ represents the total number of the grids in the target cleaning area i;

determining whether the preset target function has a solution under a preset constraint condition; if it is determined that the preset target function has the solution, it is represented that there is a grid meeting the preset grid cleaning rule, and the grid meeting the preset grid cleaning rule is a grid corresponding to the solution of the preset target function;

the preset constraint condition is:

$$W' = w_3 l_2 / v + \sum_{k=1}^{K} w_1 q_{ij_k} \beta_1 + \sum_{k=1}^{K} \alpha \beta_2 q_{ij_k}^2 <= W_{max},$$

wherein, W' represents power consumption during a process in which the cleaning robot moves from the starting grid, finishes cleaning all the grids determined to be cleaned from the target cleaning area and reaches the ending grid, as second power consumption; $l_2$ represents a length of the shortest path along which the cleaning robot travels from the starting grid, finishes cleaning all the grids determined to be cleaned from the target cleaning area and reaches the ending grid, as a length of a second cleaning path; v represents a walking speed of the cleaning robot among grids by means of a walking motor; $w_3$ represents a current of the walking motor during operation; $w_3 l_2/v$ represents power consumption of the walking motor when the cleaning robot travels along the second cleaning path; $q_{ij_k}$ represents the target dirtiness factors for the grids determined to be cleaned from the target cleaning area; $w_1$ represents a current of a side brush of the cleaning robot during operation;

$$\sum_{k=1}^{K} w_1 q_{ij_k} \beta_1$$

represents power consumption of the side brush of the cleaning robot during operation;

$$\sum_{k=1}^{K} \alpha \beta_2 q_{ij_k}^2$$

represents power consumption of a fan or a rolling brush during operation; α, $\beta_1$ and $\beta_2$ are preset proportion factors, respectively; $W_{max}$ represents the current power.

Optionally, the step of cleaning the target cleaning area based on the determined target cleaning grid, the starting grid and the ending grid includes:

cleaning the target cleaning area according to the second cleaning path.

Optionally, after the step of cleaning all the grids in the target cleaning area, the method further includes:

obtaining, by statistics, and recording a dirtiness factor for each of the grids in the target cleaning area during cleaning this time as a first historical dirtiness factor;

acquiring dirtiness factors recorded in a preset number of previous cleanings for each of the grids in the target cleaning area as second historical dirtiness factors;

for each of the grids in the target cleaning area, updating the target dirtiness factor for the grid based on the first historical dirtiness factor and the second historical dirtiness factors for the grid.

On the other hand, an embodiment of the present application provides a cleaning robot, including:

a power detection unit configured for detecting a power of the cleaning robot;

a processor configured for: after obtaining a cleaning instruction for a target scene, acquiring a scene map for the target scene and acquiring a current power of the cleaning robot detected by the power detection unit; if it is determined that the current power is insufficient to clean all areas to be cleaned in the target scene, determining a target cleaning area from all the areas to be cleaned in the target scene based on a target dirtiness level for each of the areas to be cleaned; controlling a moving unit and a cleaning unit to clean the target cleaning area, based on the scene map, the target dirtiness level for the target cleaning area and the current power;

the moving unit configured for driving the cleaning robot to move;

the cleaning unit configured for cleaning the target cleaning area.

Optionally, the processor is specifically configured for:

determining an area to be cleaned having a maximum target dirtiness level from all the areas to be cleaned in the target scene as the target cleaning area, based on the target dirtiness level for each of the areas to be cleaned.

Optionally, the processor is specifically configured for:

determining an area to be cleaned having a minimum target dirtiness level from all the areas to be cleaned in the target scene as the target cleaning area, based on the target dirtiness level for each of the areas to be cleaned.

Optionally, all areas in the target scene are represented in the scene map in a preset reduced scale, and each of the areas in the target scene represented in the scene map is divided into a plurality of grids in advance;

each of the grids in each of the areas in the target scene corresponds to a target dirtiness factor; wherein, the target dirtiness factor is a factor determined based on historical dirtiness factors for the corresponding grid and is in direct proportion to a dirtiness situation of the corresponding grid, and the target dirtiness level for the target cleaning area is a sum or average of target dirtiness factors for all the grids in the target cleaning area;

the processor is specifically configured for:

determining a grid where the cleaning robot is located in the target scene as a starting grid and determining a grid where a charging base is located in the target scene as an ending grid, based on the grids in each of the areas in the target scene in the scene map;

determining a path from the starting grid to the ending grid through all the grids in the target cleaning area as a first cleaning path, based on the grids in each of the areas in the target scene in the scene map;

determining power consumption during a process of controlling the cleaning unit and the moving unit to finish cleaning all the grids in the target cleaning area as first power consumption, based on the first cleaning path and the target dirtiness factors for all the grids in the target cleaning area;

determining whether the first power consumption is greater than the current power;

the first cleaning unit being configured for, if it is determined that the first power consumption is not greater than the current power, controlling the cleaning unit and the moving unit to clean all the grids in the target cleaning area, based on the grids in each of the areas in the target scene in the scene map, the first cleaning path and the target dirtiness factors for all the grids in the target cleaning area.

Optionally, the cleaning unit includes a fan or a rolling brush and a side brush, and the moving unit includes a walking motor;

a formula used by the processor is:

$$W_i = w_3 l_1 / v + \sum_{j=1}^{n_i} w_1 q_{ij} \beta_1 + \sum_{j=1}^{n_i} \alpha \beta_2 q_{ij}^2,$$

wherein, $W_i$ represents the first power consumption; $l_1$ represents a length of the first cleaning path; v represents a walking speed of the cleaning robot among grids by means of the walking motor; $w_3$ represents a current of the walking motor during operation; $w_3 l_1/v$ represents power consumption of the walking motor when the cleaning robot travels along the first cleaning path; $q_{ij}$ represents a target dirtiness factor for a grid j in a target cleaning area i; a value range of j is $[1, n_i]$; $n_i$ represents the total number of the grids in the target cleaning area i; $w_i$ represents a current of the side brush of the cleaning robot during operation;

$$\sum_{j=1}^{n_i} w_1 q_{ij} \beta_1$$

represents power consumption of the side brush of the cleaning robot during operation;

$$\sum_{j=1}^{n_i} \alpha \beta_2 q_{ij}^2$$

represents power consumption of the fan or the rolling brush during operation; $\alpha$, $\beta_1$ and $\beta_2$ are preset proportion factors, respectively.

Optionally, the processor is further configured for:

after cleaning all the grids in the target cleaning area, based on the grids in each of the areas in the target scene in the scene map, the first cleaning path and the target dirtiness factors for all the grids in the target cleaning area, returning to acquire the current power of the cleaning robot.

Optionally, the processor is further configured for:

if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area, wherein the preset grid cleaning rule is a rule that defines the sum of the target dirtiness factors for the grids determined to be cleaned from the target cleaning area to be maximum if the current power allows;

if it is determined that there is a grid meeting the preset grid cleaning rule, determining the grid meeting the preset grid cleaning rule as a target cleaning grid;

controlling the cleaning unit and the moving unit to clean the target cleaning area based on the determined target cleaning grid, the starting grid and the ending grid.

Optionally, the cleaning unit includes a fan or a rolling brush and a side brush, and the moving unit includes a walking motor;

the processor is specifically configured for:

acquiring a preset target function for representing a maximum sum of the target dirtiness factors for the grids determined to be cleaned from the target cleaning area, wherein the preset target function is:

$$Q = \sum_{k=1}^{K} q_{ij_k},$$

wherein, $q_{ij_k}$ represents the target dirtiness factors for the grids determined to be cleaned from the target cleaning area; a value range of K is $[1,n_i]$; $n_i$ represents the total number of the grids in a target cleaning area i;

determining whether the preset target function has a solution under a preset constraint condition; wherein, if it is determined that the preset target function has the solution, it is represented that there is a grid meeting the preset grid cleaning rule, and the grid meeting the preset grid cleaning rule is a grid corresponding to the solution of the preset target function;

the preset constraint condition is:

$$W' = w_3 l_2/v + \sum_{k=1}^{K} w_1 q_{ij_k} \beta_1 + \sum_{k=1}^{K} \alpha \beta_2 q_{ij_k}^2 <= W_{max},$$

wherein, W' represents power consumption during a process in which the cleaning robot controls the cleaning unit and the moving unit to move from the starting grid, finish cleaning all the grids determined to be cleaned from the target cleaning area and reach the ending grid, as second power consumption; $l_2$ represents a length of the shortest path along which the cleaning robot travels from the starting grid, finishes cleaning all the grids determined to be cleaned from the target cleaning area and reaches the ending grid, as a length of a second cleaning path; v represents a walking speed of the cleaning robot among grids by means of the walking motor; $w_3$ represents a current of the walking motor during operation; $w_3 l_2/v$ represents power consumption of the walking motor when the cleaning robot travels along the second cleaning path; $q_{ij_k}$ represents the target dirtiness factors for the grids determined to be cleaned from the target cleaning area; $w_1$ represents a current of the side brush of the cleaning robot during operation;

$$\sum_{k=1}^{K} w_1 q_{ij_k} \beta_1$$

represents power consumption of the side brush of the cleaning robot during operation;

$$\sum_{k=1}^{K} \alpha \beta_2 q_{ij_k}^2$$

represents power consumption of the fan or the rolling brush during operation; $\alpha$, $\beta_1$ and $\beta_2$ are preset proportion factors, respectively; $W_{max}$ represents the current power.

Optionally, the processor is specifically configured for:

controlling the cleaning unit and the moving unit to clean the target cleaning area according to the second cleaning path.

Optionally, the processor is further configured for:

after cleaning all the grids in the target cleaning area, obtaining, by statistics, and recording a dirtiness factor for each of the grids in the target cleaning area during cleaning this time as a first historical dirtiness factor;

acquiring dirtiness factors recorded in a preset number of previous cleanings for each of the grids in the target cleaning area as second historical dirtiness factors;

for each of the grids in the target cleaning area, updating the target dirtiness factor for the grid based on the first historical dirtiness factor and the second historical dirtiness factors for the grid.

On the other hand, an embodiment of the present application provides a computer-readable storage medium, in which a computer program is stored. The computer program, when executed by a processor, performs the steps of the cleaning method provided by any one of the embodiments of the present application.

On the other hand, an embodiment of the present application provides a computer program product that, when executed by a computer, causes the computer to perform the steps of the cleaning method provided by any one of the above embodiments.

In the embodiments of the present application, after a cleaning robot obtains a cleaning instruction for a target scene, the cleaning robot acquires a current power of the cleaning robot and a scene map for the target scene; if it is determined that the current power is insufficient to clean all areas to be cleaned in the target scene, the cleaning robot determines a target cleaning area from all the areas to be cleaned in the target scene based on a target dirtiness level for each of the areas to be cleaned; the cleaning robot cleans the target cleaning area based on the scene map, the target dirtiness level for the target cleaning area and the current power.

In the embodiments of the present application, if the cleaning robot determines that its current power is insufficient to clean all areas to be cleaned in the target scene, the cleaning robot may determine the target cleaning area to be cleaned based on target dirtiness levels for all areas to be cleaned in the target scene, such that the cleaning robot is more intelligent when determining the target cleaning area and thus the target cleaning area determined thereby is more reasonable. Further, the cleaning robot may clean the target cleaning area based on the scene map for the target scene, the current power and the target dirtiness level for the target cleaning area, such that the cleaning robot is more intelligent and the cleaning process of the cleaning robot is more reasonable. Of course, it is not necessary for any product or method of implementing the present application to achieve all of the advantages set forth above at the same time.

BRIEF DESCRIPTION OF THE DRAWINGS

In order to more clearly illustrate the technical solutions of the embodiments of the present application or of the prior art, drawings that need to be used in the embodiments or the prior art will be briefly described below. Obviously, the drawings described below are for only some embodiments of the present application. Based on these drawing, other drawings can be obtained by those skilled in the art without any creative efforts.

DETAILED DESCRIPTION

The technical solutions in the embodiments of the present application will be clearly and completely described below with reference to the drawings in the embodiments of the present application. Obviously, the described drawings are only some, not all of embodiments of the present application. Based on the embodiments in the present application, all other embodiments obtained by those skilled in the art without any creative efforts fall within the scope of protection of the present application.

Embodiments of the present application provide a cleaning method and a cleaning robot, so as to realize a more intelligent cleaning robot and a more reasonable cleaning process.

Figure 1:
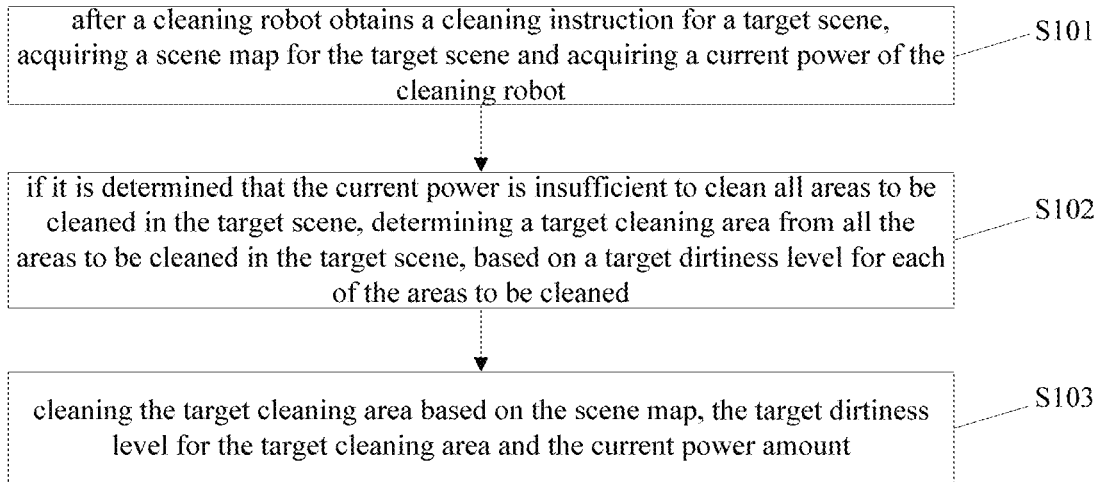
FIG. 1 is a schematic flow chart of a cleaning method provided by an embodiment of the present application.

As shown in FIG. 1, an embodiment of the present application provides a cleaning method. The method may include the following steps.

S101: after a cleaning robot obtains a cleaning instruction for a target scene, acquiring a scene map for the target scene and acquiring a current power of the cleaning robot.

The cleaning method provided by the embodiment of the present application may be applied to a cleaning robot. The cleaning robot may include a cleaning unit, which may include a fan, a rolling brush and/or a dust suction device to enable the cleaning robot to collect garbage such as dust in the target scene, and may further include a side brush to enable the cleaning robot to clean garbage such as dust in the target scene. The cleaning robot may further include a moving unit, which may include a walking motor to enable the cleaning robot to walk in the target scene. In an implementation, the cleaning robot may be provided with two walking motors so as to ensure its balance during walking.

It can be understood that the cleaning instruction mentioned in the embodiment of the present application may be either triggered by a user or automatically triggered by the cleaning robot, which are both feasible. Wherein, the user triggering manner may be implemented by a user clicking a function button, configured for performing a cleaning function, in the cleaning robot to trigger a cleaning instruction, or by a voice signal of the user to trigger the cleaning instruction. Wherein, the voice signal may include wake-up information that enables the cleaning robot to trigger the cleaning instruction and that may include, but not limited to, information such as "cleaning" and "sweeping" and the like.

In the embodiment of the present application, the target scene may be a scene where the cleaning robot is located, for example, within a room. After obtaining a cleaning instruction for the target scene, the cleaning robot may acquire a scene map for the target scene. Wherein, the scene map may be a map created for the target scene, such as a map that is obtained by reducing the target scene according to a preset ratio. In addition, the cleaning robot may acquire its current remaining power as the current power in the embodiment of the present application. Moreover, in one case, the cleaning robot may include a power detection unit, through which the cleaning robot can acquire its current remaining power. In one case, the power detection unit may be a power sensing device.

In an implementation, when cleaning the target scene for the first time, the cleaning robot may perform a fully traversal cleaning, during which a scene map is created for the target scene. During the creation of the scene map for the target scene, the cleaning robot divides each area of the target scene using a grid with a predetermined size, i.e., divides each area of the target scene in the scene map into grids with the predetermined size. In addition, for each grid, the cleaning robot determines the amount of dust (i.e., a target dirtiness factor to be described later) for each grid by a dust detection unit of the cleaning robot. Wherein, the fully traversal cleaning refers to cleaning all the locations in the target scene. In one case, techniques such as a laser rangefinder and inertial navigation and the like may also be utilized when creating the scene map for the target scene.

In an implementation, the fully traversal cleaning may refer to cleaning all the locations in the target scene in the shape of the Chinese character "弓" based on the principle of proximity.

S102: if it is determined that the current power is insufficient to clean all areas to be cleaned in the target scene, determining a target cleaning area from all the areas to be cleaned in the target scene based on a target dirtiness level for each of the areas to be cleaned.

In an implementation, the target scene represented by the scene map is divided into a plurality of areas in advance. Wherein the target scene may be divided based on rooms in the target scene or based on various functional areas in the target scene. Wherein the functional areas may include a kitchen area, a bedroom area, a bathroom area, a living room area, a dining area, a doorway area and so on. It can be understood that each area in the target scene represented by the scene map corresponds to a unique area identifier. In one case, the areas to be cleaned may be all or part of the areas in the target scene.

Wherein, each area in the target scene corresponds to a target dirtiness level, which may be determined based on the total amount of garbage, such as dust, for this area during a historical cleaning process. Wherein, the historical cleaning process may be a cleaning process before the acquisition of the cleaning instruction.

Wherein, the target dirtiness level for each area in the target scene may indicate the amount of dust in this area. In one case, it is possible that the higher the target dirtiness level for an area in the target scene is, the larger the total amount of garbage, such as dust, in the area in the target scene is.

In an embodiment of the present application, if determining that the current power is insufficient to clean all areas to be cleaned in the target scene, the cleaning robot may directly determine a target cleaning area from all the areas to be cleaned, based on the target dirtiness level for each of the areas to be cleaned. In an implementation, the target cleaning area may be an area conforming to a preset determination rule that may be set based on user requirements. In one case, the preset determination rule may correspond to a maximum target dirtiness level, or correspond to a minimum target dirtiness level, or correspond to a middle-most target dirtiness level, i.e., correspond to a target dirtiness level that is located in the middle of a queue obtained by sorting the areas in an ascending or descending order based on target dirtiness levels.

In an implementation, the cleaning robot may determine whether the current power is sufficient to clean all areas to be cleaned in the target scene by setting a power threshold. When it is determined that the current power is greater than the set power threshold, it is indicated that the current power is sufficient to clean all areas to be cleaned in the target scene. When it is determined that the current power is not greater than the set power threshold, it is indicated that the current power is insufficient to clean all areas to be cleaned in the target scene. In one case, if the cleaning robot determines that the current power is sufficient to clean all areas to be cleaned in the target scene, the cleaning robot may perform a fully-traversal and non-repetitive cleaning for all the areas to be cleaned in the target scene. The specific cleaning manner is not limited in this embodiment, which may be cleaning based on the principle of proximity, or may be cleaning based on the target dirtiness level for each area to be cleaned (e.g., cleaning firstly an area with the maximum target dirtiness level, then cleaning an area with the minimum target dirtiness level), which are both feasible. Wherein, the fully-traversal and non-repetitive cleaning may refer to cleaning only once for each area and only once for each location within each area in one cleaning process.

S103: cleaning the target cleaning area based on the scene map, the target dirtiness level for the target cleaning area and the current power.

It can be understood that the scene map may be a map that is obtained by reducing the target scene according to a preset ratio, and may represent locational relationships between all areas in the target scene. In an embodiment of the present application, the cleaning robot may clean the target cleaning area based on the scene map, the target dirtiness level for the target cleaning area and the current power. Specifically, the cleaning robot may control the cleaning unit and the moving unit to clean the target cleaning area. The cleaning robot moves in the target cleaning area by means of the moving unit such that the cleaning robot cleans the location where it reaches by means of the cleaning unit.

In one case, in the cleaning process of the cleaning robot, the cleaning robot may consume different powers to cleaning areas that correspond to different target dirtiness levels. Wherein it is possible that the higher the target dirtiness level for an area is, the greater the power consumption of the cleaning robot when cleaning this area will be. In view of above, the cleaning robot may determine in advance, based on the current power, the scene map and the target dirtiness level for the target cleaning area, whether the cleaning robot is able to clean the entire target cleaning area, that is, to perform a fully traversal cleaning for the target cleaning area. The entire target cleaning area will be cleaned if it is determined in advance that the current power is sufficient to clean the entire target cleaning area, and partial target cleaning area will be cleaned if it is determined in advance that the current power is insufficient to clean the entire target cleaning area.

In the embodiment of the present application, if the cleaning robot determines in advance that its current power is insufficient to clean all areas to be cleaned in the target scene, the cleaning robot may determine the target cleaning area to be cleaned based on target dirtiness levels for all areas to be cleaned in the target scene, such that the cleaning robot is more intelligent when determining the target cleaning area and thus the target cleaning area determined thereby is more reasonable. Further, the cleaning robot may clean the target cleaning area based on the scene map for the target scene, the current power and the target dirtiness level for the target cleaning area, such that the cleaning robot is more intelligent and the cleaning process of the cleaning robot is more reasonable.

In an implementation, if the cleaning robot determines in advance that the current power is insufficient to clean all areas to be cleaned in the target scene, in order to maintain the overall cleanliness of the target scene, the cleaning robot may clean the areas to be cleaned with high dirtiness levels preferentially in the embodiment of the present application, thus the usage of the power of the cleaning robot is improved and the cleaning efficiency is improved to some extent. Specifically, the step of determining a target cleaning area from all the areas to be cleaned in the target scene based on a target dirtiness level for each of the areas to be cleaned may include:

determining an area to be cleaned having a maximum target dirtiness level from all the areas to be cleaned in the target scene as the target cleaning area, based on the target dirtiness level for each of the areas to be cleaned.

In one case, if the cleaning robot determines that the current power is insufficient to clean all the areas to be cleaned in the target cleaning area, the cleaning robot sorts firstly all the areas to be cleaned in an ascending order or a descending order based on their corresponding target dirtiness levels, and then determines, based on the sorting order, the area to be cleaned having the maximum target dirtiness level as the target cleaning area.

Wherein, when sorting all the areas to be cleaned in an ascending order based on their corresponding target dirtiness levels, the area to be cleaned at the last location in the sorted sequence is determined as the target cleaning area. When sorting all the areas to be cleaned in a descending order based on their corresponding target dirtiness levels, the area to be cleaned at the first location in the sorted sequence is determined as the target cleaning area.

In another implementation, the user may require a higher cleanliness of the target scene. In one case, the user may only need the cleaning robot to clean areas to be cleaned having low target dirtiness levels in the target scene, while the user may manually clean areas to be cleaned having high target dirtiness levels in the target scene. In this case, if the cleaning robot determines that the current power is insufficient to clean all areas to be cleaned in the target scene, the cleaning robot may clean the areas to be cleaned having low target dirtiness levels preferentially in order to meet the user requirement. The step of determining a target cleaning area from all the areas to be cleaned in the target scene based on a target dirtiness level for each of the areas to be cleaned may include:

determining an area to be cleaned having a minimum target dirtiness level from all the areas to be cleaned in the target scene as the target cleaning area, based on the target dirtiness level for each of the areas to be cleaned.

In one case, if the cleaning robot determines that the current power is insufficient to clean all the areas to be cleaned in the target scene, the cleaning robot sorts firstly all the areas to be cleaned in an ascending order or a descending order based on their corresponding target dirtiness levels, and then determines the area to be cleaned having the minimum target dirtiness level as the target cleaning area based on the sorting order.

Wherein, when sorting all the areas to be cleaned in a descending order based on their corresponding target dirtiness levels, the area to be cleaned at the last location in the sorted sequence is determined as the target cleaning area. When sorting all the areas to be cleaned in an ascending order based on their corresponding target dirtiness levels, the area to be cleaned at the first location in the sorted sequence is determined as the target cleaning area.

In an implementation, in order to greatly improve user experience and thus realize a more intelligent cleaning robot, in an embodiment of the present application, it is also required by the cleaning robot to walk automatically to the location of the charging base for charging after cleaning the target cleaning area. In view of this, the cleaning robot needs to consider that after cleaning the target cleaning area, the remaining power thereof needs to be sufficient to support its walking to the location of the charging base for charging. The scene map includes location information representing the location of the charging base in the target scene, and the cleaning robot may determine its location in the target scene and identify the location in the scene map. In the cleaning process, the cleaning robot may perform the following actions with the current power: moving from the current location to the target cleaning area, and moving in the target cleaning area, cleaning the locations through which it passes, and moving to the charging base for charging after cleaning the target cleaning area.

In an implementation, all areas in the target scene are represented in the scene map in a preset reduced scale, and each of the areas in the target scene represented in the scene map is divided into a plurality of grids in advance.

Each of the grids for each of the areas in the target scene corresponds to a target dirtiness factor. The target dirtiness factor is a factor determined based on historical dirtiness factors for the corresponding grid and is in direct proportion to the dirtiness situation of the corresponding grid, and the target dirtiness level for the target cleaning area is a sum or average of target dirtiness factors for all the grids in the target cleaning area.

Figure 2:
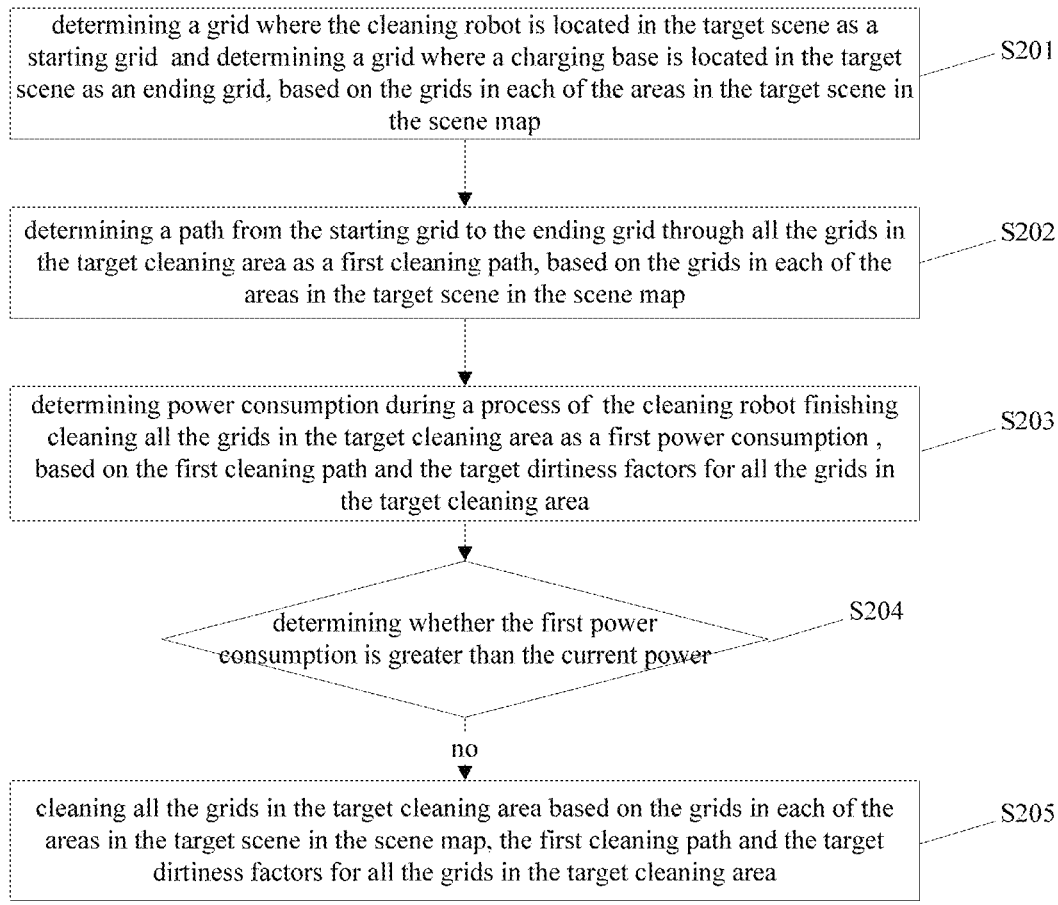
FIG. 2 is a schematic flow chart of cleaning a target cleaning area provided by an embodiment of the present application.

As shown in FIG. 2, the step of cleaning the target cleaning area based on the scene map, the target dirtiness level for the target cleaning area and the current power may include:

S201: determining a grid where the cleaning robot is located in the target scene as a starting grid and determining a grid where the charging base is located in the target scene as an ending grid, based on the grids in each of the areas in the target scene in the scene map;

S202: determining a path from the starting grid to the ending grid through all the grids in the target cleaning area as a first cleaning path, based on the grids in each of the areas in the target scene in the scene map;

S203: determining power consumption during a process of the cleaning robot finishing cleaning all the grids in the target cleaning area as first power consumption, based on the first cleaning path and the target dirtiness factors for all the grids in the target cleaning area;

S204: determining whether the first power consumption is greater than the current power;

S205: if it is determined that the first power consumption is not greater than the current power, cleaning all the grids in the target cleaning area based on the grids in each of the areas in the target scene in the scene map, the first cleaning path and the target dirtiness factors for all the grids in the target cleaning area.

Figure 3A:
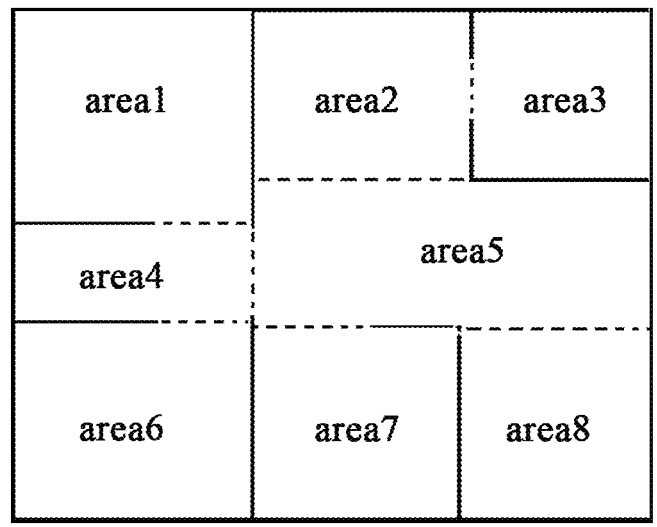
FIG. 3A is a schematic diagram of a scene map for a target scene.
Figure 3B:
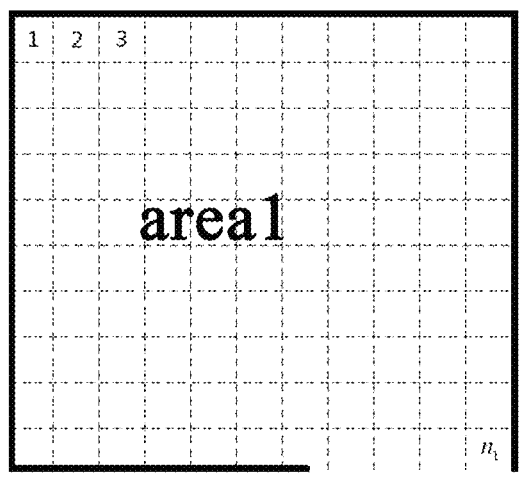
FIG. 3B is a schematic diagram of the "area 1" shown in FIG. 3A being divided into a plurality of grids.

As shown in FIG. 3A, which is a schematic diagram of a scene map for a target scene, the target scene in the scene map is divided into 8 areas, which are denoted as "area 1", "area 2", "area 3", "area 4", "area 5", "area 6", "area 7" and "area 8" respectively. Taking the "area 1" as an example, as shown in FIG. 3B, which is a schematic diagram of the "area 1" shown in FIG. 3A being divided into a plurality of grids, the grids may be respectively denoted by 1, integers between 1 and $n_1$, and $n_1$. Wherein, $n_1$ may represent the total number of grids included in the "area 1".

Figure 3C:
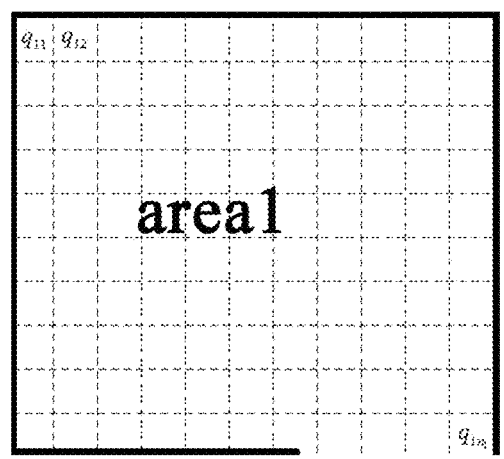
FIG. 3C is a schematic diagram of target dirtiness factors for grids in the "area 1" shown in FIG. 3B.
Figure 3D:
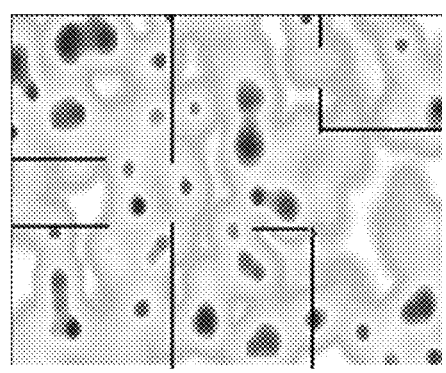
FIG. 3D is another schematic diagram of a scene map for the target scene shown in FIG. 3A.

In one case, the scene map may further include the target dirtiness factor for each of the grids in each of the areas. Wherein the target dirtiness factors may be directly shown by numerical values or by colors. As shown in FIG. 3C, which is a schematic diagram of the target dirtiness factors for the grids in the "area 1" shown in FIG. 3B, the target dirtiness factors for the grids in the "area 1" may be denoted by numerical values. As shown in FIG. 3D, which is another schematic diagram of the scene map for the target scene shown in FIG. 3A, the target dirtiness factor for each of the grids in each of the areas in the target scene is shown by colors in FIG. 3D, wherein the darker a color in the diagram is, the higher the target dirtiness factor for the location of the color is, i.e. the dirtier this location is.

It can be understood that the scene map may be a map that is obtained by reducing the target scene according to a preset ratio, the target scene represented by the scene map is divided into a plurality of areas in advance, and each of the areas of the target scene represented by the scene map is divided into a plurality of grids in advance. That is, all the areas in the target scene can be represented in the scene map in a preset reduced scale, and all the grids of each of the areas of the target scene can be represented in a preset reduced scale.

Figure 3E:
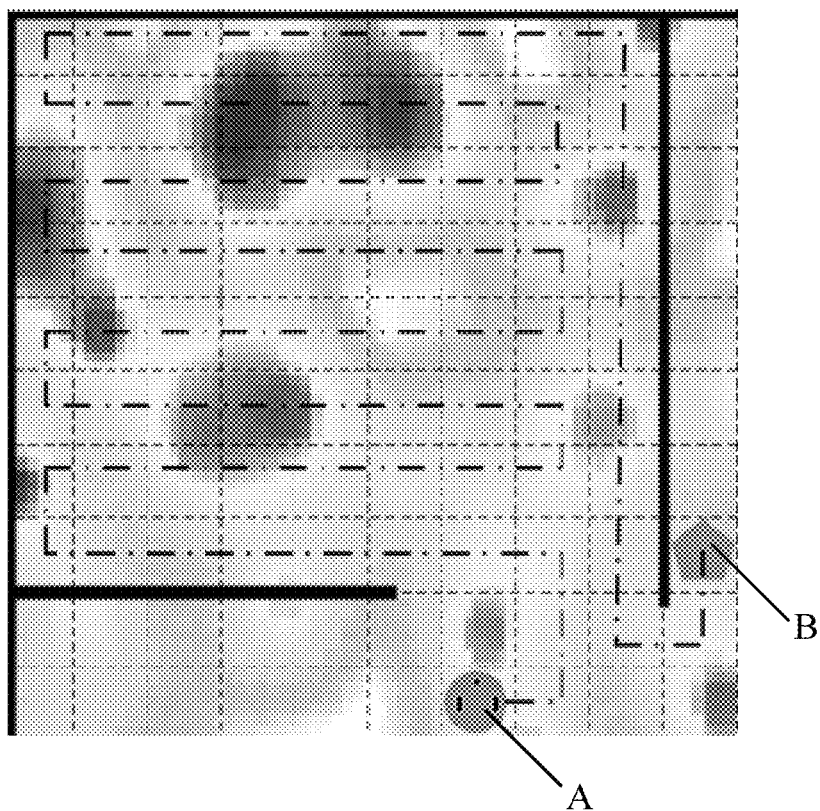
FIG. 3E is a schematic diagram of the cleaning robot traveling through all the grids in the target cleaning area.

In the embodiment of the present application, the cleaning robot may determine, based on the scene map, the grid where the cleaning robot is located in the target scene, and use this grid as a starting grid in the embodiment of the present application. The cleaning robot may determine, based on the scene map, the grid where the charging base is located in the target scene, and use this grid as an ending grid in the embodiment of the present application. The cleaning robot may determine, based on the scene map, a path along which the cleaning robot moves from the starting grid to the target cleaning area and then through all the grids in the target cleaning area and to the ending grid, and in the embodiment of the present application use this path as the first cleaning path. Wherein, in order to better utilize the current power of the cleaning robot and improve the usage of the current power, the path along which the cleaning robot moves from the starting grid to the target cleaning area may be the shortest path from the starting grid to the target cleaning area. Moreover, the path along which the cleaning robot moves to the ending grid after traveling through all the grids in the target cleaning area may be the shortest path of the cleaning robot moving to the ending grid after traveling through all the grids in the target cleaning area. In an implementation, the cleaning robot may move based on a preset 弓-shape rule when traveling through all the grids in the target cleaning area, so as to non-repetitively pass through all the grids in the target cleaning area. As shown in FIG. 3E, which is a schematic diagram of the cleaning robot traveling through all the grids in the target cleaning area, the cleaning robot moves based on the preset 弓-shape rule shown in FIG. 3E, and the starting grid may be represented at the "A" location shown in FIG. 3E, and the ending grid may be represented at the "B" location shown in FIG. 3E.

It can be understood that in the cleaning process, the cleaning robot may perform the cleaning by adopting different cleaning modes with different power consumption modes. In the embodiment of the present application, the cleaning robot may adopt different cleaning modes to clean the target scene based on the grids in each of the areas in the target scene in the scene map, the current power, and the target dirtiness factor for each of the grids in the target cleaning area.

In an implementation, the power consumed by the cleaning robot during the cleaning process may be divided into three types: 1. the power consumed by the moving unit, such as a walking motor, of the cleaning robot during the movement of the cleaning robot; 2. the power consumed by a cleaning unit, such as a fan or rolling brush, of the cleaning robot during the cleaning of grids; 3. the power consumed by a cleaning unit, such as an side brush, of the cleaning robot during the cleaning of the grids. When determining how to clean the target cleaning area, it can be estimated, based on the above three types of power consumed, whether the current power of the cleaning robot can support it to clean all the grids in the target cleaning area. That is, the power required to be consumed by the cleaning robot in the process of moving along the first cleaning path and cleaning all the grids in the target cleaning area can be estimated, and then whether the power required to be consumed is less than or equal to the current power is determined. If it is determined that the power required to be consumed is less than or equal to the current power, it can be indicated that the current power of the cleaning robot can support it to clean all the grids in the target cleaning area. If it is determined that the power required to be consumed is greater than the current power, it can be indicated that the current power of the cleaning robot cannot support it to clean all the grids in the target cleaning area.

If it is determined that the power required to be consumed is less than or equal to the current power, the cleaning robot can move along the first path and clean all the grids in the target cleaning area.

In an implementation, in the step of determining power consumption during a process of the cleaning robot finishing cleaning all the grids in the target cleaning area as first power consumption, based on the first cleaning path and the target dirtiness factors for all the grids in the target cleaning area, the following formula can be used:

$$W_i = w_3 l_1 / v + \sum_{j=1}^{n_i} w_1 q_{ij} \beta_1 + \sum_{j=1}^{n_i} \alpha \beta_2 q_{ij}^2.$$

Wherein, $W_i$ represents the first power consumption; $l_1$ represents the length of the first cleaning path; $v$ represents the walking speed of the cleaning robot among grids by means of the walking motor; $w_3$ represents the current of the walking motor during operation; $w_3 l_1/v$ represents the power consumption of the walking motor when the cleaning robot travels along the first cleaning path; $q_{ij}$ represents the target dirtiness factor for the grid j in the target cleaning area i; the value range of j is $[1, n_i]$; $n_i$ represents the total number of the grids in the target cleaning area i; $w_i$ represents the current of the side brush of the cleaning robot during operation;

$$\sum_{j=1}^{n_i} w_1 q_{ij} \beta_1$$

represents the power consumption of the side brush of the cleaning robot during operation;

$$\sum_{j=1}^{n_i} \alpha \beta_2 q_{ij}^2$$

represents the power consumption of the fan or the rolling brush during operation; $\alpha$, $\beta_1$ and $\beta_2$ are preset proportion factors, respectively.

In one case, when the fan or the rolling brush of the cleaning robot is in operation, that is, when the cleaning robot cleans the jth grid in the target cleaning area i with the fan or the rolling brush, the current is $w_2$. Wherein, $w_2$ is in direct proportion to the target dirtiness factor for the grid, and the proportional relationship may be denoted as a. That is, when cleaning the grid, the larger the target dirtiness factor for the grid is, the larger the current required by the fan or the rolling brush of the cleaning robot is. The time required by the fan or rolling brush of the cleaning robot to finish cleaning one grid, such as the jth grid in the target cleaning area i, is in direct proportion to the target dirtiness factor for the grid, and the proportional relationship may be denoted as $\beta_2$. That is, when cleaning the grid, the larger the target dirtiness factor for the grid is, the longer the time required by the fan or the rolling brush of the cleaning robot to clean is. That is, when cleaning the grid, the higher the target dirtiness factor for the grid is, the greater the power consumption of the fan or the roll brush of the cleaning robot is. Wherein, there may be the current $w_2 = \alpha q_{ij}$ of the fan or the rolling brush when cleaning the jth grid in the target cleaning area i, and the time $t_1 = \beta_2 q_{ij}$ required by the fan or the rolling brush to finish cleaning the jth grid in the target cleaning area i.

The time required by the side brush of the cleaning robot in operation (i.e., when the cleaning robot is cleaning a grid, such as the jth grid in the target cleaning area i, with the side brush) is in direct proportion to the target dirtiness factor for the grid, and the proportional relationship may be denoted as $\beta_1$. That is, when cleaning the grid, the larger the target dirtiness factor for the grid is, the longer the time required by the side brush of the cleaning robot to clean is. When the current of the side brush during operation remains unchanged, the larger the target dirtiness factor for the grid is, the greater the power consumption of the side brush of the cleaning robot is. Wherein there may be the time $t_2 = \beta_1 q_{ij}$ required by the side brush to finish cleaning the jth grid in the target cleaning area i.

In one case, the fan or the rolling brush and the side brush need to cooperate with each other when the cleaning robot cleans the grid, and the time required by the fan or the rolling brush to work on one grid may be the same as the time required by the side brush to work on this grid, and thus $\beta_1$ may be equal to $\beta_2$.

In an implementation, after the step of cleaning all the grids in the target cleaning area based on the grids in each of the areas in the target scene in the scene map, the first cleaning path and the target dirtiness factors for all the grids in the target cleaning area, the method may further include:

returning to perform the step of acquiring the current power of the cleaning robot.

It can be understood that when the cleaning robot determines to clean all the grids in the target cleaning area, it can be indicated that its current power is sufficient to clean all the grids in the target cleaning area. After the cleaning robot finishes cleaning all the grids in the determined target cleaning area, the remaining power of the cleaning robot may be sufficient to clean other areas to be cleaned. In this case, the cleaning robot may return to perform the step of acquiring the current power of the cleaning robot and perform the subsequent cleaning process, rather than move to the location of the charging base.

Figure 4:
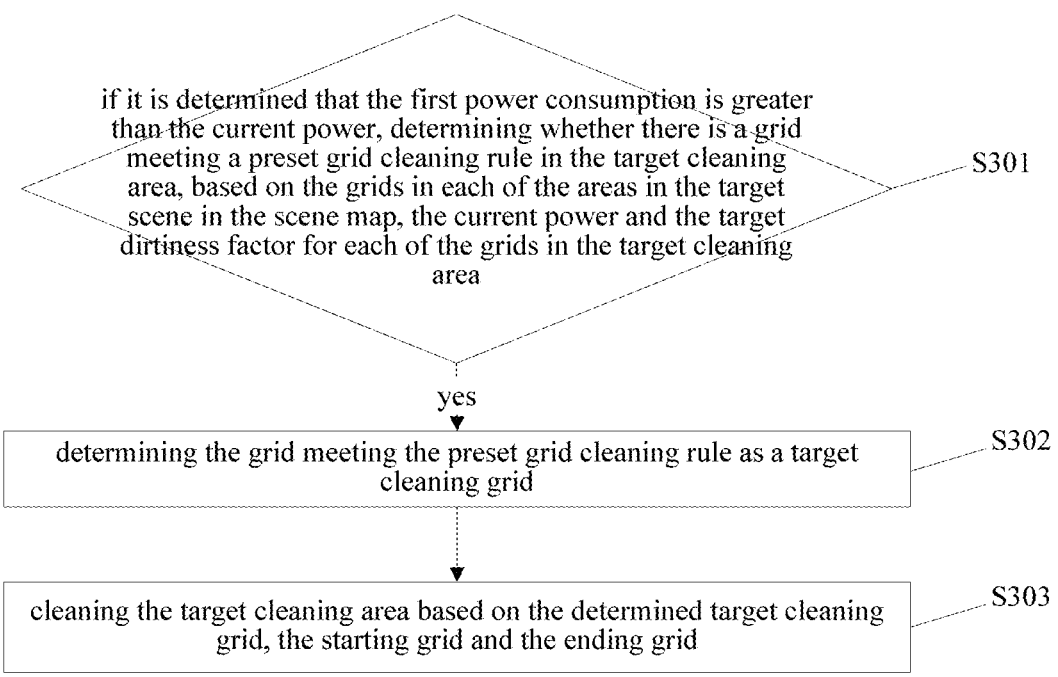
FIG. 4 is a schematic flow chart of cleaning a target cleaning area provided by an embodiment of the present application.

In one possible case, the calculated first power consumption may be greater than the current power, it can be indicated that the current power of the cleaning robot is insufficient to clean the entire target cleaning area. That is, it is indicated that the current power of the cleaning robot is insufficient to clean all the grids in the target cleaning area. In view of this, as shown in FIG. 4, the cleaning method provided in the embodiment of the present application may further include:

S401: if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area.

Wherein, the preset grid cleaning rule may be a rule that defines the sum of the target dirtiness factors for the grids determined to be cleaned from the target cleaning area to be maximum if the current power allows.

S402: if it is determined that there is a grid meeting the preset grid cleaning rule, determining the grid meeting the preset grid cleaning rule as a target cleaning grid;

S403: cleaning the target cleaning area based on the determined target cleaning grid, the starting grid and the ending grid.

It can be understood that, if the cleaning robot determines that the first power consumption is greater than the current power, that is, when the current power is insufficient to clean all the grids in the target cleaning area, the cleaning path may be re-planned based on the preset grid cleaning rule. If the current power allows, the cleaning robot can clean a set of grids with the maximum sum of the target dirtiness factors for the grids in the target cleaning area. Wherein, this set of grids may include one or more grids in the target cleaning area.

If it is determined that there is a grid meeting the preset grid cleaning rule in the target cleaning area based on the current power, the grids in each of the areas in the target scene in the scene map and the target dirtiness factor for each of the grids in the target cleaning area, the grid meeting the preset grid cleaning rule is determined, and the target cleaning area is cleaned based on the grid meeting the preset grid cleaning rule, the starting grid and the ending grid. In one case, the cleaning robot may determine the shortest path that passes through each grid meeting the preset grid cleaning rule from the starting grid as a starting point to the ending grid as an ending point based on the grids in each of the areas of the target scene in the scene map, and control the cleaning unit and the moving unit to clean the target cleaning area based on the determined shortest path.

If it is determined that there are no grids meeting the preset grid cleaning rule in the target cleaning area, it can be indicated that the current power of the cleaning robot is too low and the cleaning robot is in a low power state. At this time, the cleaning robot needs to move to the location of the charging base for charging.

In an implementation, the step of determining whether there is a grid meeting a preset grid cleaning rule in the target cleaning area, based on the grids in each of the areas in the target scene in the scene map, the current power and the target dirtiness factor for each of the grids in the target cleaning area may include:

acquiring a preset target function for representing a maximum sum of the target dirtiness factors for the grids determined to be cleaned from the target cleaning area, wherein the preset target function is:

$$Q = \sum_{k=1}^{K} q_{ij_k}.$$

Wherein, $q_{ij_k}$ represents the target dirtiness factors for the grids determined to be cleaned from the target cleaning area; the value range of K is $[1,n_i]$, $n_i$ represents the total number of the grids in the target cleaning area i;

determining whether the preset target function has a solution under a preset constraint condition; if it is determined that the preset target function has a solution, it is represented that there is a grid meeting the preset grid cleaning rule, and the grid meeting the preset grid cleaning rule is a grid corresponding to the solution of the preset target function;

the preset constraint condition is:

$$W' = w_3 l_2/v + \sum_{k=1}^{K} w_1 q_{ij_k} \beta_1 + \sum_{k=1}^{K} \alpha \beta_2 q_{ij_k}^2 <= W_{max},$$

wherein, W' represents the power consumption during a process in which the cleaning robot moves from the starting grid, finish cleaning all the grids determined to be cleaned from the target cleaning area and reaches the ending grid, as second power consumption; $l_2$ represents the length of the shortest path along which the cleaning robot travels from the starting grid, finishes cleaning all the grids determined to be cleaned from the target cleaning area and reaches the ending grid, as the length of a second cleaning path; v represents a walking speed of the cleaning robot among grids by means of the walking motor; $w_3$ represents the current of the walking motor during operation; $w_3 l_2/v$ represents the power consumption of the walking motor when the cleaning robot travels along the second cleaning path; $q_{ij_k}$ represents the target dirtiness factors for the grids determined to be cleaned from the target cleaning area; $w_1$ represents the current of the side brush of the cleaning robot during operation;

$$\sum_{k=1}^{K} w_1 q_{ij_k} \beta_1$$

represents the power consumption of the side brush of the cleaning robot during operation;

$$\sum_{k=1}^{K} \alpha \beta_2 q_{ij_k}^2$$

represents the power consumption of the fan or the rolling brush during operation; $\alpha$, $\beta_1$ and $\beta_2$ are preset proportion factors, respectively; $W_{max}$ represents the current power.

It can be understood that if it is determined that the preset target function has a solution under the preset constraint condition, it can be indicated that there is a grid meeting the preset grid cleaning rule in the target cleaning area, and the grid corresponding to this solution determined under the preset constraint condition is a grid meeting the preset grid cleaning rule in the target cleaning area.

Wherein, $q_{ij_k}$ represents the target dirtiness factors for the grids determined to be cleaned from the target cleaning area, which represents that $q_{ij_k}$ represents target dirtiness factor for each of the grids determined to be cleaned from the target cleaning area.

Figure 5A:
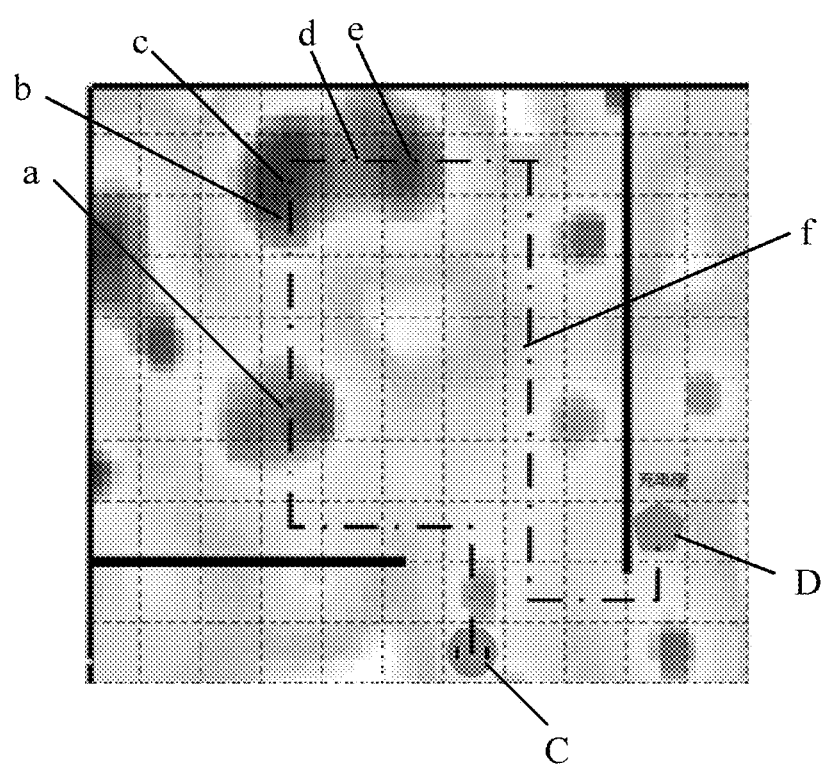
FIG. 5A is a schematic diagram of the cleaning robot traveling through the grids, meeting a preset grid cleaning rule, in the target cleaning area.
Figure 5B:
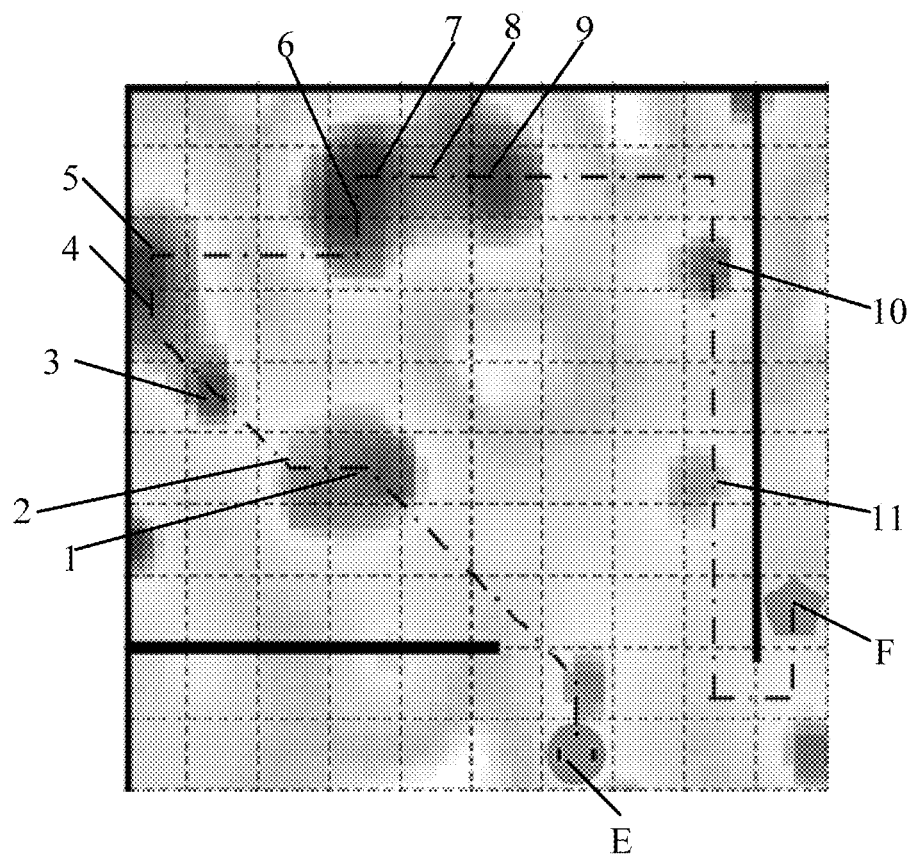
FIG. 5B is another schematic diagram of the cleaning robot traveling through the grids, meeting the preset grid cleaning rule, in the target cleaning area.

In one case, the shortest path from the starting grid to the ending grid through the grids meeting the preset grid cleaning rule may be pre-estimated and determined by means of a dynamic programming method, based on the grids in each of the areas of the target scene in the scene map. As shown in FIG. 5A, which is a schematic diagram of the cleaning robot traveling through the grids meeting the preset grid cleaning rule in the target cleaning area, the location "C" shown in FIG. 5A may represent the starting grid, the location "D" shown in FIG. 5A may represent the ending grid, and the locations "a", "b", "c", "d", "e" and "f" shown in FIG. 5A represent the determined grids meeting the preset grid cleaning rule, respectively. As shown in FIG. 5B, which is another schematic diagram of the cleaning robot traveling through the grids meeting the preset grid cleaning rule in the target cleaning area, the location "E" shown in FIG. 5B may represent the starting grid, the location "F" shown in FIG. 5B may represent the ending grid, and locations "1", "2", "3", "4", "5", "6", "7", "8", "9", "10" and "11" shown in FIG. 5B represent the determined grids meeting the preset grid cleaning rule, respectively.

In other words, the locations "a", "b", "c", "d", "e" and "f" as shown in FIG. 5A represent the determined grids meeting the preset grid cleaning rule, respectively. In this case, K may be equal to 6. When "a", "b", "c", "d", "e" and "f" are the identifiers of the corresponding grids in the target cleaning area, respectively, there is $$\sum_{k=1}^{K} \alpha\beta_2 q_{ij_k}^2 \alpha\beta_2 q_a^2 + \alpha\beta_2 q_b^2 + \alpha\beta_2 q_c^2 + \alpha\beta_2 q_d^2 + \alpha\beta_2 q_e^2 + \alpha\beta_2 q_f^2;$$

and correspondingly, there is $$\sum_{k=1}^{K} w_1 q_{ij_k} \beta_1 = w_1 q_a \beta_1 + w_1 q_b \beta_1 + w_1 q_c \beta_1 + w_1 q_d \beta_1 + w_1 q_e \beta_1 + w_1 q_f \beta_1.$$

The locations "1", "2", "3", "4", "5", "6", "7", "8", "9", "10" and "11" as shown in FIG. 5B represent the determined grids meeting the preset grid cleaning rule, respectively, and K may be equal to 11. When "1", "2", "3", "4", "5", "6", "7", "8", "9", "10" and "11" are the identifiers of the corresponding grids in the target cleaning area, respectively, there is $$\sum_{k=1}^{K} \alpha\beta_2 q_{ij_k}^2 = \alpha\beta_2 q_1^2 + \alpha\beta_2 q_2^2 + \alpha\beta_2 q_3^2 + \alpha\beta_2 q_4^2 +$$

-continued
$$\alpha\beta_2 q_5^2 + \alpha\beta_2 q_6^2 + \alpha\beta_2 q_7^2 + \alpha\beta_2 q_8^2 + \alpha\beta_2 q_9^2 + \alpha\beta_2 q_{10}^2 + \alpha\beta_2 q_{11}^2;$$

and correspondingly, there is $$\sum_{k=1}^{K} w_1 q_{ij_k} \beta_1 = w_1 q_1 \beta_1 + w_1 q_2 \beta_1 + w_1 q_3 \beta_1 + w_1 q_4 \beta_1 + w_1 q_5 \beta_1 +$$
$$w_1 q_6 \beta_1 + w_1 q_7 \beta_1 + w_1 q_8 \beta_1 + w_1 q_9 \beta_1 + w_1 q_{10} \beta_1 + w_1 q_{11} \beta_1.$$

In one case, when the fan or the rolling brush of the cleaning robot is in operation, that is, when the cleaning robot cleans the jth grid in the target cleaning area i with the fan or the rolling brush, the current is $w_2$. Wherein, $w_2$ is in direct proportion to the target dirtiness factor for the grid, and the proportional relationship may be denoted as a. That is, when cleaning the grid, the larger the target dirtiness factor for the grid is, the larger the current required by the fan or the rolling brush of the cleaning robot is. The time required by the fan or rolling brush of the cleaning robot to finish cleaning one grid, such as the jth grid in the target cleaning area i, is in direct proportion to the target dirtiness factor for the grid, and the proportional relationship may be denoted as $\beta_2$. That is, when cleaning the grid, the larger the target dirtiness factor for the grid is, the longer the time required by the fan or the rolling brush of the cleaning robot to clean is. That is, when cleaning the grid, the higher the target dirtiness factor for the grid is, the greater the power consumption of the fan or the roll brush of the cleaning robot is.

The time required by the side brush of the cleaning robot in operation (i.e., when the cleaning robot is cleaning a grid, such as the jth grid in the target cleaning area i, with the side brush) is in direct proportion to the target dirtiness factor for the grid, and the proportional relationship may be denoted as $\beta_1$. That is, when cleaning the grid, the larger the target dirtiness factor for the grid is, the longer the time required by the side brush of the cleaning robot to clean is. When the current of the side brush during operation remains unchanged, the larger the target dirtiness factor for the grid is, the greater the power consumption of the side brush of the cleaning robot is.

In one case, the fan or the rolling brush and the side brush need to cooperate with each other when the cleaning robot cleans the grid, and the time required by the fan or the rolling brush to work on one grid may be the same as the time required by the side brush to work on this grid, and thus $\beta_1$ may be equal to $\beta_2$.

In an implementation, after finishing cleaning the target cleaning area, the target cleaning area may be identified based on the scene map, to distinguish it from the areas to be cleaned. In one case, after finishing cleaning the target cleaning area, the target cleaning area may be set based on the scene map, so as to change its state from a non-set state to a set state. If the cleaning robot fails to acquire a cleaning instruction for the target scene within a predetermined time threshold, all of the set areas may be modified into the non-set state based on the scene map.

The step of cleaning the target cleaning area based on the determined target cleaning grid, the starting grid and the ending grid may include:

cleaning the target cleaning area according to the second cleaning path.

In one case, in order to better reduce the power consumed by the cleaning robot and improve the usage of the power of the cleaning robot, the fan or the rolling brush and the side brush can be turned off during the process of the cleaning robot walking among the grids according to the second cleaning path, so as to save the power. Only when the cleaning robot moves to the target cleaning grid, the fan or the rolling brush and the side brush may be turned on to clean the target cleaning grid.

The cleaning robot may directly move to the location of the charging base for charging after cleaning the target cleaning area according to the second cleaning path.

After the step of cleaning all the grids in the target cleaning area, the method may further include:

obtaining, by statistics, and recording a dirtiness factor for each of the grids in the target cleaning area during cleaning this time as a first historical dirtiness factor;

acquiring dirtiness factors recorded in a preset number of previous cleanings for each of the grids in the target cleaning area as second historical dirtiness factors;

for each of the grids in the target cleaning area, updating the target dirtiness factor for the grid based on the first historical dirtiness factor and the second historical dirtiness factors for the grid.

In one case, the grid may be a grid of a predetermined size. The cleaning robot may detect the amount of dust for the grid in the target cleaning area by a dust detection unit in real time, when cleaning the grid in the target cleaning area. Wherein, when the area of the grid is large, for example, larger than a preset area threshold, the cleaning robot may detect the grid for a plurality of times by the dust detection unit, thus generating a plurality of detection results, wherein one detection result is generated during one detection process. At this time, the first historical dirtiness factor for the grid may be determined based on the generated detection results, wherein, either the sum or the average of the plurality of detection results may be used as the first historical dirtiness factor for the grid, which are both feasible.

In the embodiment of the present application, the preset number may be a value set autonomously by the user, or may be a value set by the cleaning robot as a default, which are both feasible. In one case, the preset number may be denoted as t, the first historical dirtiness factor may be denoted as $d_0$, and the dirtiness factors recorded in the previous t times of cleanings, i.e. the second historical dirtiness factors, may be denoted as $d_1$-$d_t$, respectively. In the case where the number t is small, for example, smaller than a predetermined threshold, for each of the grids in the target cleaning area, updating the target dirtiness factor for the grid based on the first historical dirtiness factor $d_0$ and the second historical dirtiness factors $d_1$-$d_t$ for the grid may include: calculating the average value of the first historical dirtiness factor $d_0$ and the second historical dirtiness factors $d_1$-$d_t$, and updating the calculated average value as the target dirtiness factor for the grid. When the value of t is large, for example, no less than the predetermined threshold, it can be determined that the dirtiness factor for the grid conforms to a Gaussian distribution, at this time, the cleaning robot may calculate parameters of the Gaussian distribution based on $d_0$ and $d_1$-dt, wherein the distribution mean value in the parameters of the Gaussian distribution may be updated as the target dirtiness factor for the grid, wherein the distribution mean value may be denoted as $d_{mean}$.

Figure 6:
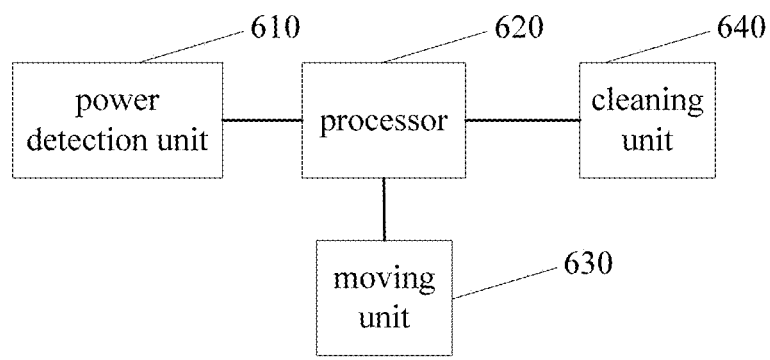
FIG. 6 is a schematic structural diagram of a cleaning robot provided by an embodiment of the present application.

Corresponding to the above embodiment of the method, an embodiment of the present application further provides a cleaning robot, as shown in FIG. 6. The cleaning robot may include:

a power detection unit 610 configured for detecting the power of the cleaning robot;

a processor 620 configured for: after obtaining a cleaning instruction for a target scene, acquiring a scene map for the target scene and acquiring a current power of the cleaning robot detected by the power detection unit; if it is determined that the current power is insufficient to clean all areas to be cleaned in the target scene, determining a target cleaning area from all the areas to be cleaned in the target scene, based on a target dirtiness level for each of the areas to be cleaned; controlling a cleaning unit 630 and a moving unit 640 to clean the target cleaning area based on the scene map, the target dirtiness level for the target cleaning area and the current power;

the moving unit 630 configured for driving the cleaning robot to move;

the cleaning unit 640 configured for cleaning the target cleaning area.

In the embodiment of the present application, if the cleaning robot determines that its current power is insufficient to clean all areas to be cleaned in the target scene, the cleaning robot may determine the target cleaning area to be cleaned based on target dirtiness levels for all areas to be cleaned in the target scene, such that the cleaning robot is more intelligent when determining the target cleaning area and thus the target cleaning area determined thereby is more reasonable. Further, the cleaning robot may clean the target cleaning area based on the scene map for the target scene, the current power and the target dirtiness level for the target cleaning area, such that the cleaning robot is more intelligent and the cleaning process of the cleaning robot is more reasonable.

In an implementation, the processor 620 is specifically configured for determining an area to be cleaned having a maximum target dirtiness level from all the areas to be cleaned in the target scene as the target cleaning area, based on the target dirtiness level for each of the areas to be cleaned.

In an implementation, the processor 620 is specifically configured for determining an area to be cleaned having a minimum target dirtiness level from all the areas to be cleaned in the target scene as the target cleaning area, based on the target dirtiness level for each of the areas to be cleaned.

In an implementation, all areas in the target scene are represented in the scene map in a preset reduced scale, and each of the areas in the target scene represented in the scene map is divided into a plurality of grids in advance;

each of the grids in each of the areas in the target scene corresponds to a target dirtiness factor; wherein, the target dirtiness factor is a factor determined based on historical dirtiness factors for the corresponding grid and is in direct proportion to a dirtiness situation of the corresponding grid, and the target dirtiness level for the target cleaning area is a sum or average of target dirtiness factors for all the grids in the target cleaning area;

the processor 620 specifically configured for:

determining a grid where the cleaning robot is located in the target scene as a starting grid and determining a grid where a charging base is located in the target scene as an ending grid, based on the grids in each of the areas in the target scene in the scene map;

determining a path from the starting grid to the ending grid through all the grids in the target cleaning area as a first cleaning path, based on the grids in each of the areas in the target scene in the scene map;

determining power consumption during a process of controlling the cleaning unit and the moving unit to finish cleaning all the grids in the target cleaning area as first power consumption, based on the first cleaning path and the target dirtiness factors for all the grids in the target cleaning area;

determining whether the first power consumption is greater than the current power;

if it is determined that the first power consumption is not greater than the current power, controlling the cleaning unit and the moving unit to clean all the grids in the target cleaning area, based on the grids in each of the areas in the target scene in the scene map, the first cleaning path and the target dirtiness factors for all the grids in the target cleaning area.

In an implementation, the cleaning unit includes a fan or a rolling brush and a side brush, and the moving unit includes a walking motor;

a formula used by the processor is:

$$W_i = w_3 \frac{l_1}{v} + \sum_{j=1}^{n_i} w_1 q_{ij} \beta_1 + \sum_{j=1}^{n_i} \alpha \beta_2 q_{ij}^2,$$

wherein, $W_i$ represents the first power consumption; $l_1$ represents a length of the first cleaning path; v represents a walking speed of the cleaning robot among grids by means of the walking motor; $w_3$ represents a current of the walking motor during operation; $w_3 l_1 / v$ represents power consumption of the walking motor when the cleaning robot travels along the first cleaning path; $q_{ij}$ represents a target dirtiness factor for a grid j in a target cleaning area i; a value range of j is $[1,n_i]$; $n_i$ represents the total number of the grids in the target cleaning area i; $w_i$ represents a current of the side brush of the cleaning robot during operation;

$$\sum_{j=1}^{n_i} w_1 q_{ij} \beta_1$$

represents power consumption of the side brush of the cleaning robot during operation;

$$\sum_{j=1}^{n_i} \alpha \beta_2 q_{ij}^2$$

represents power consumption of the fan or the rolling brush during operation; $\alpha$, $\beta_1$ and $\beta_2$ are preset proportion factors, respectively.

In an implementation, the processor 620 is further configured for:

after cleaning all the grids in the target cleaning area, based on the grids in each of the areas in the target scene in the scene map, the first cleaning path and the target dirtiness factors for all the grids in the target cleaning area, returning to acquire the current power of the cleaning robot.

In an implementation, the processor 620 is further configured for:

if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area, wherein the preset grid cleaning rule is a rule that defines the sum of the target dirtiness factors for the grids determined to be cleaned from the target cleaning area to be maximum if the current power allows;

if it is determined that there is a grid meeting the preset grid cleaning rule, determining the grid meeting the preset grid cleaning rule as a target cleaning grid;

controlling the cleaning unit and the moving unit to clean the target cleaning area based on the determined target cleaning grid, the starting grid and the ending grid.

In an implementation, the cleaning unit includes a fan or a rolling brush and a side brush, and the moving unit includes a walking motor;

the processor 620 is specifically configured for:

acquiring a preset target function for representing a maximum sum of the target dirtiness factors for the grids determined to be cleaned from the target cleaning area, wherein the preset target function is:

$$Q = \sum_{k=1}^{K} q_{ij_k},$$

wherein, $q_{ij_k}$ represents the target dirtiness factors for the grids determined to be cleaned from the target cleaning area; a value range of K is $[1,n_i]$; $n_i$ represents the total number of the grids in the target cleaning area i;

determining whether the preset target function has a solution under a preset constraint condition; wherein, if it is determined that the preset target function has the solution, it is represented that there is a grid meeting the preset grid cleaning rule, and the grid meeting the preset grid cleaning rule is a grid corresponding to the solution of the preset target function;

the preset constraint condition is:

$$W' = w_3 \frac{l_2}{v} + \sum_{k=1}^{K} w_1 q_{ij_k} \beta_1 + \sum_{k=1}^{K} \alpha \beta_2 q_{ij_k}^2 <= W_{max},$$

wherein, W' represents power consumption during a process in which cleaning robot controls the cleaning unit and the moving unit to move from the starting grid, finish cleaning each of the grids determined to be cleaned from the target cleaning area and reach the ending grid, as second power consumption; $l_2$ represents a length of the shortest path along which the cleaning robot travels from the starting grid, finishes cleaning each of the grids determined to be cleaned from the target cleaning area and reaches the ending grid, as a length of a second cleaning path; v represents a walking speed of the cleaning robot among grids by means of the walking motor; $w_3$ represents a current of the walking motor during operation; $w_3 l_2 / v$ represents power consumption of the walking motor when the cleaning robot travels along the second cleaning path; $q_{ij_k}$ represents the target dirtiness factors for the grids determined to be cleaned from the target cleaning area; $w_1$ represents a current of the side brush of the cleaning robot during operation;

$$\sum_{k=1}^{K} w_1 q_{ij_k} \beta_1$$

represents power consumption of the side brush of the cleaning robot during operation;

$$\sum_{k=1}^{K} \alpha \beta_2 q_{ij_k}^2$$

represents power consumption of the fan or the rolling brush during operation; $\alpha$, $\beta_1$ and $\beta_2$ are preset proportion factors, respectively; $W_{max}$ represents the current power.

In an implementation, the processor 620 is specifically configured for:

controlling the cleaning unit and the moving unit to clean the target cleaning area according to the second cleaning path.

In an implementation, the processor 620 is further configured for:

after cleaning all the grids in the target cleaning area, obtaining, by statistics, and recording a dirtiness factor for each of the grids in the target cleaning area during cleaning this time as a first historical dirtiness factor;

acquiring dirtiness factors recorded in a preset number of previous cleanings for each of the grids in the target cleaning area as second historical dirtiness factors;

for each of the grids in the target cleaning area, updating the target dirtiness factor for the grid based on the first historical dirtiness factor and the second historical dirtiness factors for the grid.

In an implementation, the above cleaning robot may further include a dust detection unit. The cleaning robot may detect and store the amount of dust for a grid in the target cleaning area, when cleaning the grid in the target cleaning area, with the dust detection unit in real time. wherein when the area of the grid is large, for example, larger than a preset area threshold, the cleaning robot may detect the grid for a plurality of times by the dust detection unit, thus generating a plurality of detection results. Wherein one detection result is generated during one detection process, and thereby determining the amount of dust for the grid based on the plurality of detection results for each of the grids, for instance, taking the sum or the average of the plurality of detection results as the amount of dust for this grid. Subsequently, the processor of the cleaning robot may determine a dirtiness factor for each of the grids during one cleaning process by acquiring the amount of dust for each of the grids detected by the dust detection unit. Subsequently, the processor of the cleaning robot may update the target dirtiness factor for each of the grids based on the determined dirtiness factor for each of the grids during each cleaning process.

In an implementation, the step of the processor of the cleaning robot determining a dirtiness factor for each of the grids during one cleaning process by acquiring the amount of dust for each of the grids detected by the dust detection unit may be: determining the amount of dust for each of the grids as the dirtiness factor for the grid during one cleaning process; or determining the dirtiness factor for each of the grids during one cleaning process by acquiring the amount of dust for each of the grids detected by the dust detection unit, based on a direct proportion relationship; or, determining the dirtiness factor for each of the grids during one cleaning process by acquiring the amount of dust for each of the grids detected by the dust detection unit, based on an inverse proportion relationship.

The foregoing processor may be a general-purpose processor, including a Central Processing Unit (CPU), a Network Processor (NP), and the like; or a Digital Signal Processing (DSP), an Application Specific Integrated Circuit (ASIC), a Field-Programmable Gate Array (FPGA) or other programmable logic devices, discrete gate or transistor logic devices, discrete hardware components.

Corresponding to the above embodiment of the method, an embodiment of the present application provides a computer-readable storage medium, in which a computer program is stored. The computer program, when executed by a processor, performs any one of the cleaning methods provided by the embodiments of the present application. The cleaning method may include:

after a cleaning robot obtains a cleaning instruction for a target scene, acquiring a scene map for the target scene and acquiring a current power of the cleaning robot;

if it is determined that the current power is insufficient to clean all areas to be cleaned in the target scene, determining a target cleaning area from all the areas to be cleaned in the target scene, based on a target dirtiness level for each of the areas to be cleaned;

cleaning the target cleaning area based on the scene map, the target dirtiness level for the target cleaning area and the current power.

In the embodiment of the present application, if the cleaning robot determines that its current power is insufficient to clean all areas to be cleaned in the target scene, the cleaning robot may determine the target cleaning area to be cleaned based on target dirtiness levels for all areas to be cleaned in the target scene, such that the cleaning robot is more intelligent when determining the target cleaning area and thus the target cleaning area determined thereby is more reasonable. Further, the cleaning robot may clean the target cleaning area based on the scene map for the target scene, the current power and the target dirtiness level for the target cleaning area, such that the cleaning robot is more intelligent and the cleaning process of the cleaning robot is more reasonable.

In an implementation, determining a target cleaning area from all the areas to be cleaned in the target scene, based on a target dirtiness level for each of the areas to be cleaned includes:

determining an area to be cleaned having a maximum target dirtiness level from all the areas to be cleaned in the target scene as the target cleaning area, based on the target dirtiness level for each of the areas to be cleaned.

In an implementation, determining a target cleaning area from all the areas to be cleaned in the target scene, based on a target dirtiness level for each of the areas to be cleaned includes:

determining an area to be cleaned having a minimum target dirtiness level from all the areas to be cleaned in the target scene as the target cleaning area, based on the target dirtiness level for each of the areas to be cleaned.

In an implementation, all areas in the target scene are represented in the scene map in a preset reduced scale, and each of the areas in the target scene represented in the scene map is divided into a plurality of grids in advance, each of the grids in each of the areas in the target scene corresponds to a target dirtiness factor; wherein, the target dirtiness factor is a factor determined based on historical dirtiness factors for the corresponding grid and is in direct proportion to a dirtiness situation of the corresponding grid, and the target dirtiness level for the target cleaning area is a sum or average of target dirtiness factors for all the grids in the target cleaning area;

cleaning the target cleaning area based on the scene map, the target dirtiness level for the target cleaning area and the current power includes:

determining a grid where the cleaning robot is located in the target scene as a starting grid and determining a grid where a charging base is located in the target scene as an ending grid, based on the grids in each of the areas in the target scene in the scene map;

determining a path from the starting grid to the ending grid through all the grids in the target cleaning area as a first cleaning path, based on the grids in each of the areas in the target scene in the scene map;

determining power consumption during a process of the cleaning robot finishing cleaning all the grids in the target cleaning area as first power consumption, based on the first cleaning path and the target dirtiness factors for all the grids in the target cleaning area;

determining whether the first power consumption is greater than the current power;

if it is determined that the first power consumption is not greater than the current power, cleaning all the grids in the target cleaning area, based on the grids in each of the areas in the target scene in the scene map, the first cleaning path and the target dirtiness factors for all the grids in the target cleaning area.

In an implementation, a formula used in the step of determining power consumption during a process of the cleaning robot finishing cleaning all the grids in the target cleaning area as first power consumption, based on the first cleaning path and the target dirtiness factors for all the grids in the target cleaning area is:

$$W_i = w_3 \frac{l_1}{v} + \sum_{j=1}^{n_i} w_1 q_{ij} \beta_1 + \sum_{j=1}^{n_i} \alpha \beta_2 q_{ij}^2,$$

wherein, $W_i$ represents the first power consumption; $l_1$ represents a length of the first cleaning path; $v$ represents a walking speed of the cleaning robot among grids by means of a walking motor; $w_3$ represents a current of the walking motor during operation; $w_3 l_1/v$ represents power consumption of the walking motor when the cleaning robot travels along the first cleaning path; $q_{ij}$ represents a target dirtiness factor for a grid j in a target cleaning area i; a value range of j is $[1,n_i]$; $n_i$ represents the total number of the grids in the target cleaning area i; $w_i$ represents a current of a side brush of the cleaning robot during operation;

$$\sum_{j=1}^{n_i} w_1 q_{ij} \beta_1$$

represents power consumption of the side brush of the cleaning robot during operation;

$$\sum_{j=1}^{n_i} \alpha \beta_2 q_{ij}^2$$

represents power consumption of a fan or a rolling brush during operation; $\alpha$, $\beta_1$ and $\beta_2$ are preset proportion factors, respectively.

In an implementation, after cleaning all the grids in the target cleaning area, based on the grids in each of the areas in the target scene in the scene map, the first cleaning path and the target dirtiness factors for all the grids in the target cleaning area, the method further includes:

returning to acquire the current power of the cleaning robot.

In an implementation, the method further includes:

if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area, wherein the preset grid cleaning rule is a rule that defines the sum of the target dirtiness factors for the grids determined to be cleaned from the target cleaning area to be maximum if the current power allows;

if it is determined that there is a grid meeting the preset grid cleaning rule, determining the grid meeting the preset grid cleaning rule as a target cleaning grid;

cleaning the target cleaning area based on the determined target cleaning grid, the starting grid and the ending grid.

In an implementation, the step of determining whether there is a grid meeting a preset grid cleaning rule in the target cleaning area, based on the grids in each of the areas in the target scene in the scene map, the current power and the target dirtiness factor for each of the grids in the target cleaning area includes:

acquiring a preset target function for representing a maximum sum of the target dirtiness factors for the grids determined to be cleaned from the target cleaning area, wherein the preset target function is:

$$Q = \sum_{k=1}^{K} q_{ij},$$

wherein, $q_{ij_k}$ represents the target dirtiness factors for the grids determined to be cleaned from the target cleaning area; a value range of K is $[1,n_i]$; $n_i$ represents the total number of the grids in the target cleaning area i;

determining whether the preset target function has a solution under a preset constraint condition; wherein, if it is determined that the preset target function has the solution, it is represented that there is a grid meeting the preset grid cleaning rule, and the grid meeting the preset grid cleaning rule is a grid corresponding to the solution of the preset target function;

the preset constraint condition is:

$$W' = w_3 \frac{l_2}{v} + \sum_{k=1}^{K} w_1 q_{ij_k} \beta_1 + \sum_{k=1}^{K} \alpha \beta_2 q_{ij_k}^2 <= W_{max},$$

wherein, W' represents power consumption during a process in which the cleaning robot moves from the starting grid, finishes cleaning all the grids determined to be cleaned from the target cleaning area and reaches the ending grid, as second power consumption; $l_2$ represents a length of the shortest path along which the cleaning robot travels from the starting grid, finishes cleaning all the grids determined to be cleaned from the target cleaning area and reaches the ending grid, as a length of a second cleaning path; v represents a walking speed of the cleaning robot among grids by means of a walking motor; $w_3$ represents a current of the walking motor during operation; $w_3 l_2/v$ represents power consumption of the walking motor when the cleaning robot travels along the second cleaning path; $q_{ij_k}$ represents the target dirtiness factors for the grids determined to be cleaned from the target cleaning area; $w_1$ represents a current of a side brush of the cleaning robot during operation;

$$\sum_{k=1}^{K} w_1 q_{ij_k} \beta_1$$

represents power consumption of the side brush of the cleaning robot during operation;

$$\sum_{k=1}^{K} \alpha \beta_2 q_{ij_k}^2$$

represents power consumption of a fan or a rolling brush during operation; $\alpha$, $\beta_1$ and $\beta_2$ are preset proportion factors, respectively; $W_{max}$ represents the current power.

In an implementation, the step of cleaning the target cleaning area based on the determined target cleaning grid, the starting grid and the ending grid includes:

cleaning the target cleaning area according to the second cleaning path.

In an implementation, after cleaning all the grids in the target cleaning area, the method further includes:

obtaining, by statistics, and recording a dirtiness factor for each of the grids in the target cleaning area during cleaning this time as a first historical dirtiness factor;

acquiring dirtiness factors recorded in a preset number of previous cleanings for each of the grids in the target cleaning area as second historical dirtiness factors;

for each of the grids in the target cleaning area, updating the target dirtiness factor for the grid based on the first historical dirtiness factor and the second historical dirtiness factors for the grid.

Corresponding to the above embodiment of the method, an embodiment of the present application provides a computer program product that, when executed by a computer, causes the computer to perform the cleaning method of any one of the above embodiments.

In the embodiment of the present application, if the cleaning robot determines that its current power is insufficient to clean all areas to be cleaned in the target scene, the cleaning robot may determine the target cleaning area to be cleaned based on target dirtiness levels for all areas to be cleaned in the target scene, such that the cleaning robot is more intelligent when determining the target cleaning area and thus the target cleaning area determined thereby is more reasonable. Further, the cleaning robot may clean the target cleaning area based on the scene map for the target scene, the current power and the target dirtiness level for the target cleaning area, such that the cleaning robot is more intelligent and the cleaning process of the cleaning robot is more reasonable.

It should be noted that the relationship terms used herein, such as "first", "second", and the like are only used to distinguish one entity or operation from another entity or operation, but do not necessarily require or imply that there is any such actual relationship or order between these entities or operations. Moreover, the terms "include", "comprise", or any other variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " or "include(s) a/an . . . " do not exclude additional identical elements in the processes, methods, articles, or devices including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments mentioned above are merely preferred embodiments of the present application, and are not intended to limit the scope of protection of the present application. Any modifications, equivalent replacements, and improvements and the like that are made within the spirit and principle of the present application are included in the scope of protection of the present application.

What is claimed is:

1. A cleaning method, comprising:
   after a cleaning robot obtains a cleaning instruction for a target scene, acquiring a scene map for the target scene and acquiring a current power of the cleaning robot;
   if it is determined that the current power is insufficient to clean all areas to be cleaned in the target scene, determining a target cleaning area from all the areas to be cleaned in the target scene, based on a target dirtiness level for each of the areas to be cleaned;
   cleaning the target cleaning area based on the scene map, the target dirtiness level for the target cleaning area and the current power.

2. The method of claim 1, wherein the step of determining a target cleaning area from all the areas to be cleaned in the target scene, based on a target dirtiness level for each of the areas to be cleaned comprises:
   determining an area to be cleaned having a maximum target dirtiness level from all the areas to be cleaned in the target scene as the target cleaning area, based on the target dirtiness level for each of the areas to be cleaned.

3. The method of claim 1, wherein the step of determining a target cleaning area from all the areas to be cleaned in the target scene, based on a target dirtiness level for each of the areas to be cleaned comprises:
   determining an area to be cleaned having a minimum target dirtiness level from all the areas to be cleaned in the target scene as the target cleaning area, based on the target dirtiness level for each of the areas to be cleaned.

4. The method of claim 1, wherein all areas in the target scene are represented in the scene map in a preset reduced scale, and each of the areas in the target scene represented in the scene map is divided into a plurality of grids in advance;
   each of the grids in each of the areas in the target scene corresponds to a target dirtiness factor; wherein, the target dirtiness factor is a factor determined based on historical dirtiness factors for the corresponding grid and is in direct proportion to a dirtiness situation of the corresponding grid, and the target dirtiness level for the target cleaning area is a sum or average of target dirtiness factors for all the grids in the target cleaning area;

the step of cleaning the target cleaning area based on the scene map, the target dirtiness level for the target cleaning area and the current power comprises:

determining a grid where the cleaning robot is located in the target scene as a starting grid and determining a grid where a charging base is located in the target scene as an ending grid, based on the grids in each of the areas in the target scene in the scene map;

determining a path from the starting grid to the ending grid through all the grids in the target cleaning area as a first cleaning path, based on the grids in each of the areas in the target scene in the scene map;

determining power consumption during a process of the cleaning robot finishing cleaning all the grids in the target cleaning area as first power consumption, based on the first cleaning path and the target dirtiness factors for all the grids in the target cleaning area;

determining whether the first power consumption is greater than the current power;

if it is determined that the first power consumption is not greater than the current power, cleaning all the grids in the target cleaning area based on the grids in each of the areas in the target scene in the scene map, the first cleaning path and the target dirtiness factors for all the grids in the target cleaning area.

5. The method of claim 4, wherein a formula used in the step of determining power consumption during a process of the cleaning robot finishing cleaning all the grids in the target cleaning area as first power consumption, based on the first cleaning path and the target dirtiness factors for all the grids in the target cleaning area is:

$$W_i = w_3 \frac{l_1}{v} + \sum_{j=1}^{n_i} w_1 q_{ij} \beta_1 + \sum_{j=1}^{n_i} \alpha \beta_2 q_{ij}^2,$$

wherein, $W_i$, represents the first power consumption; $l_1$ represents a length of the first cleaning path; v represents a walking speed of the cleaning robot among grids by means of a walking motor; $W_3$ represents a current of the walking motor during operation; $w_3 l_1/v$ represents power consumption of the walking motor when the cleaning robot travels along the first cleaning path; $q_{ij}$ represents a target dirtiness factor for a grid j in a target cleaning area i; a value range of j is $[1, n_i]$; $n_i$ represents the total number of the grids in the target cleaning area i; $w_i$ represents a current of a side brush of the cleaning robot during operation;

$$\sum_{j=1}^{n_i} w_1 q_{ij} \beta_1$$

represents power consumption of the side brush of the cleaning robot during operation;

$$\sum_{j=1}^{n_i} \alpha \beta_2 q_{ij}^2$$

represents power consumption of a fan or a rolling brush during operation; $\alpha$, $\beta_1$ and $\beta_2$ are preset proportion factors, respectively.

6. The method of claim 4, wherein after the step of cleaning all the grids in the target cleaning area, based on the grids in each of the areas in the target scene in the scene map, the first cleaning path and the target dirtiness factors for all the grids in the target cleaning area, the method further comprises:

returning to perform the step of acquiring the current power of the cleaning robot.

7. The method of claim 4, further comprising:

if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area, wherein the preset grid cleaning rule is a rule that defines the sum of the target dirtiness factors for the grids determined to be cleaned from the target cleaning area to be maximum if the current power allows;

if it is determined that there is a grid meeting the preset grid cleaning rule, determining the grid meeting the preset grid cleaning rule as a target cleaning grid;

cleaning the target cleaning area based on the determined target cleaning grid, the starting grid and the ending grid.

8. The method of claim 7, wherein the step of determining whether there is a grid meeting a preset grid cleaning rule in the target cleaning area, based on the grids in each of the areas in the target scene in the scene map, the current power and the target dirtiness factor for each of the grids in the target cleaning area comprises:

acquiring a preset target function for representing a maximum sum of the target dirtiness factors for the grids determined to be cleaned from the target cleaning area, wherein the preset target function is:

$$Q = \sum_{k=1}^{K} q_{ij_k},$$

wherein, $q_{ij_k}$ represents the target dirtiness factors for the grids determined to be cleaned from the target cleaning area; a value range of K is $[1, n_i]$; $n_i$ represents the total number of the grids in a target cleaning area i;

determining whether the preset target function has a solution under a preset constraint condition; if it is determined that the preset target function has the solution, it is represented that there is a grid meeting the preset grid cleaning rule, and the grid meeting the preset grid cleaning rule is a grid corresponding to the solution of the preset target function;

the preset constraint condition is:

$$W' = w_3 \frac{l_2}{v} + \sum_{k=1}^{K} w_1 q_{ij_k} \beta_1 + \sum_{k=1}^{K} \alpha \beta_2 q_{ij_k}^2 <= W_{max},$$

wherein, W' represents power consumption during a process in which the cleaning robot moves from the starting grid, finishes cleaning all the grids determined to be cleaned from the target cleaning area and reaches the ending grid, as second power consumption; $l_2$ represents a length of a shortest path along which the cleaning robot travels from the starting grid, finishes cleaning all the grids determined to be cleaned from the target cleaning area and reaches the ending grid, as a length of a second cleaning path; v represents a walking speed of the cleaning robot among grids by means of a walking motor; $W_3$ represents a current of the walking motor during operation; $w_3 l_2/v$ represents power consumption of the walking motor when the cleaning robot travels along the second cleaning path; $q_{ij_k}$ represents the target dirtiness factors for the grids determined to be cleaned from the target cleaning area; $w_1$ represents a current of a side brush of the cleaning robot during operation;

$$\sum_{k=1}^{K} w_1 q_{ij_k} \beta_1$$

represents power consumption of the side brush of the cleaning robot during operation;

$$\sum_{k=1}^{K} \alpha \beta_2 q_{ij_k}^2$$

represents power consumption of a fan or a rolling brush during operation; $\alpha$, $\beta_1$ and $\beta_2$ are preset proportion factors, respectively; $W_{max}$ represents the current power.

9. The method of claim 8, wherein the step of cleaning the target cleaning area based on the determined target cleaning grid, the starting grid and the ending grid comprises:
cleaning the target cleaning area according to the second cleaning path.

10. The method of claim 4, wherein after the step of cleaning all the grids in the target cleaning area, the method further comprises:
obtaining, by statistics, and recording a dirtiness factor for each of the grids in the target cleaning area during cleaning this time as a first historical dirtiness factor;
acquiring dirtiness factors recorded in a preset number of previous cleanings for each of the grids in the target cleaning area as second historical dirtiness factors;
for each of the grids in the target cleaning area, updating the target dirtiness factor for the grid based on the first historical dirtiness factor and the second historical dirtiness factors for the grid.

11. A cleaning robot, comprising:
a power detection unit configured for detecting a power of the cleaning robot;
a processor configured for, after obtaining a cleaning instruction for a target scene, acquiring a scene map for the target scene and acquiring a current power of the cleaning robot detected by the power detection unit; if it is determined that the current power is insufficient to clean all areas to be cleaned in the target scene, determining a target cleaning area from all the areas to be cleaned in the target scene, based on a target dirtiness level for each of the areas to be cleaned; controlling a moving unit to drive the cleaning robot into the target cleaning area, and controlling a cleaning unit to clean the target cleaning area, based on the scene map, the target dirtiness level for the target cleaning area and the current power;
the moving unit configured for driving the cleaning robot to move;
the cleaning unit configured for cleaning the target cleaning area.

12. The cleaning robot of claim 11, wherein the processor is specifically configured for:
determining an area to be cleaned having a maximum target dirtiness level from all the areas to be cleaned in the target scene as the target cleaning area, based on the target dirtiness level for each of the areas to be cleaned.

13. The cleaning robot of claim 11, wherein the processor is specifically configured for:
determining an area to be cleaned having a minimum target dirtiness level from all the areas to be cleaned in the target scene as the target cleaning area, based on the target dirtiness level for each of the areas to be cleaned.

14. The cleaning robot of claim 11, wherein all areas in the target scene are represented in the scene map in a preset reduced scale, and each of the areas in the target scene represented in the scene map is divided into a plurality of grids in advance;
each of the grids in each of the areas in the target scene corresponds to a target dirtiness factor; wherein, the target dirtiness factor is a factor determined based on historical dirtiness factors for the corresponding grid and is in direct proportion to a dirtiness situation of the corresponding grid, and the target dirtiness level for the target cleaning area is a sum or average of target dirtiness factors for all the grids in the target cleaning area;
the processor is specifically configured for:
determining a grid where the cleaning robot is located in the target scene as a starting grid and determining a grid where a charging base is located in the target scene as an ending grid, based on the grids in each of the areas in the target scene in the scene map;
determining a path from the starting grid to the ending grid through all the grids in the target cleaning area as a first cleaning path, based on the grids in each of the areas in the target scene in the scene map;
determining power consumption during a process of controlling the cleaning unit and the moving unit to finish cleaning all the grids in the target cleaning area as first power consumption, based on the first cleaning path and the target dirtiness factors for all the grids in the target cleaning area;
determining whether the first power consumption is greater than the current power;
if it is determined that the first power consumption is not greater than the current power, controlling the cleaning unit and the moving unit to clean all the grids in the target cleaning area, based on the grids in each of the areas in the target scene in the scene map, the first cleaning path and the target dirtiness factors for all the grids in the target cleaning area.

15. The cleaning robot of claim 14, wherein the cleaning unit comprises a fan or a rolling brush and a side brush, and the moving unit comprises a walking motor;
a formula used by the processor is:

$$W_i = w_3 \frac{l_1}{v} + \sum_{j=1}^{n_i} w_1 q_{ij} \beta_1 + \sum_{j=1}^{n_i} \alpha \beta_2 q_{ij}^2,$$

wherein, $W_i$ represents the first power consumption; $l_1$ represents a length of the first cleaning path; v represents a walking speed of the cleaning robot among grids by means of the walking motor; $W_3$ represents a current of the walking motor during operation; $w_3 l_1/v$ represents power consumption of the walking motor when the cleaning robot travels along the first cleaning path; $q_{ij}$ represents a target dirtiness factor for a grid j in a target cleaning area i; a value range of j is $[1,n_i]$; $n_i$ represents the total number of the grids in the target cleaning area i; $w_i$ represents a current of the side brush of the cleaning robot during operation;

$$\sum_{j=1}^{n_i} w_1 q_{ij} \beta_1$$

represents power consumption of the side brush of the cleaning robot during operation;

$$\sum_{j=1}^{n_i} \alpha \beta_2 q_{ij}^2$$

represents power consumption of the fan or the rolling brush during operation; $\alpha$, $\beta_1$ and $\beta_2$ are preset proportion factors, respectively.

16. The cleaning robot of claim 14, wherein the processor is further configured for:

after cleaning all the grids in the target cleaning area, based on the grids in each of the areas in the target scene in the scene map, the first cleaning path and the target dirtiness factors for all the grids in the target cleaning area, returning to acquire the current power of the cleaning robot.

17. The cleaning robot of claim 14, wherein, the processor is further configured for:

if it is determined that the first power consumption is greater than the current power, determining whether there is a grid meeting a preset grid cleaning rule in the target cleaning area, based on the grids in each of the areas in the target scene in the scene map, the current power and the target dirtiness factor for each of the grids in the target cleaning area, wherein the preset grid cleaning rule is a rule that defines the sum of the target dirtiness factors for the grids determined to be cleaned from the target cleaning area to be maximum if the current power allows;

if it is determined that there is a grid meeting the preset grid cleaning rule, determining the grid meeting the preset grid cleaning rule as a target cleaning grid;

controlling the cleaning unit and the moving unit to clean the target cleaning area based on the determined target cleaning grid, the starting grid and the ending grid.

18. The cleaning robot of claim 17, wherein, the cleaning unit comprises a fan or a rolling brush and a side brush, and the moving unit comprises a walking motor;

the processor is specifically configured for:

acquiring a preset target function for representing a maximum sum of the target dirtiness factors for the grids determined to be cleaned from the target cleaning area, wherein the preset target function is:

$$Q = \sum_{k=1}^{K} q_{ij_k},$$

wherein, $q_{ij_k}$ represents the target dirtiness factors for the grids determined to be cleaned from the target cleaning area; a value range of K is $[1,n_i]$; $n_i$ represents the total number of the grids in a target cleaning area i;

determining whether the preset target function has a solution under a preset constraint condition; if it is determined that the preset target function has the solution, it is represented that there is a grid meeting the preset grid cleaning rule, and the grid meeting the preset grid cleaning rule is a grid corresponding to the solution of the preset target function;

the preset constraint condition is:

$$W' = w_3 \frac{l_2}{v} + \sum_{k=1}^{K} w_1 q_{ij_k} \beta_1 + \sum_{k=1}^{K} \alpha \beta_2 q_{ij_k}^2 <= W_{max},$$

wherein, W' represents power consumption during a process in which the cleaning robot controls the cleaning unit and the moving unit to move from the starting grid, finish cleaning all the grids determined to be cleaned from the target cleaning area and reach the ending grid, as second power consumption; $l_2$ represents a length of a shortest path along which the cleaning robot travels from the starting grid, finishes cleaning all the grids determined to be cleaned from the target cleaning area and reaches the ending grid, as a length of a second cleaning path; v represents a walking speed of the cleaning robot among grids by means of the walking motor; $W_3$ represents a current of the walking motor during operation; $w_3 l_1/v$ represents power consumption of the walking motor when the cleaning robot travels along the second cleaning path; $q_{ij_k}$ represents the target dirtiness factors for the grids determined to be cleaned from the target cleaning area; $w_1$ represents a current of the side brush of the cleaning robot during operation;

$$\sum_{k=1}^{K} w_1 q_{ij_k} \beta_1$$

represents power consumption of the side brush of the cleaning robot during operation;

$$\sum_{k=1}^{K} \alpha \beta_2 q_{ij_k}^2$$

represents power consumption of the fan or the rolling brush during operation; $\alpha$, $\beta_1$ and $\beta_2$ are preset proportion factors, respectively; $W_{max}$ represents the current power;

wherein, the processor is specifically configured for controlling the cleaning unit and the moving unit to clean the target cleaning area according to the second cleaning path.

19. The cleaning robot of claim 14, wherein, the processor is further configured for:

after cleaning all the grids in the target cleaning area, obtaining, by statistics, and recording a dirtiness factor for each of the grids in the target cleaning area during cleaning this time as a first historical dirtiness factor;

acquiring dirtiness factors recorded in a preset number of previous cleanings for each of the grids in the target cleaning area as second historical dirtiness factors;

for each of the grids in the target cleaning area, updating the target dirtiness factor for the grid based on the first historical dirtiness factor and the second historical dirtiness factors for the grid.

20. A non-transitory computer-readable storage medium, in which a computer program is stored, wherein the computer program, when executed by a processor, performs steps of the cleaning method of claim 1.

* * * * *

UNITED STATES PATENT AND TRADEMARK OFFICE
CERTIFICATE OF CORRECTION

PATENT NO. : 11,589,722 B2
APPLICATION NO. : 16/957167
DATED : February 28, 2023
INVENTOR(S) : Zhu et al.

Page 1 of 1

It is certified that error appears in the above-identified patent and that said Letters Patent is hereby corrected as shown below:

In the Specification

Column 3, Line 64, please replace the equation with the following:

$$Q = \sum_{k=1}^{K} q_{ij_k}$$

Column 19, Line 46, please replace equation with the following:

$$\sum_{k=1}^{K} \alpha\beta_2 q_{ij_k}^2 = \alpha\beta_2 q_a^2 + \alpha\beta_2 q_b^2 + \alpha\beta_2 q_c^2 + \alpha\beta_2 q_d^2 + \alpha\beta_2 q_e^2 + \alpha\beta_2 q_f^2$$

In the Claims

Claim 18, Column 36, Line 38, please delete "$w_3 l_1/v$" and replace with -- $w_3 \frac{l_2}{v}$ --

Signed and Sealed this
Fifth Day of December, 2023

Katherine Kelly Vidal
*Director of the United States Patent and Trademark Office*